(12) United States Patent
Redford et al.

(10) Patent No.: US 12,705,857 B2
(45) Date of Patent: Aug. 11, 2026

(54) EXTRACTING FEATURES FROM SENSOR DATA

(71) Applicant: Five AI Limited, Cambridge (GB)

(72) Inventors: John Redford, Cambridge (GB); Anuj Sharma, Cambridge (GB); Puneet Dokania, Cambridge (GB)

(73) Assignee: Five AI Limited, Cambridge (GB)

(*) Notice: Subject to any disclaimer, the term of this patent is extended or adjusted under 35 U.S.C. 154(b) by 121 days.

(21) Appl. No.: 18/272,970

(22) PCT Filed: Jan. 20, 2022

(86) PCT No.: PCT/EP2022/051205
§ 371 (c)(1),
(2) Date: Jul. 18, 2023

(87) PCT Pub. No.: WO2022/157230
PCT Pub. Date: Jul. 28, 2022

(65) Prior Publication Data

US 2024/0312177 A1 Sep. 19, 2024

(30) Foreign Application Priority Data

Jan. 20, 2021 (GB) ..................................... 2100732
Jan. 20, 2021 (GB) ..................................... 2100739
Jan. 20, 2021 (GB) ..................................... 2100740

(51) Int. Cl.
*G06K 9/00* (2022.01)
*G06V 10/44* (2022.01)

(52) U.S. Cl.
CPC .................................... *G06V 10/44* (2022.01)

(58) Field of Classification Search
CPC ........ G06V 10/44; G06V 20/56; G06N 3/045; G06N 3/084
See application file for complete search history.

(56) References Cited

U.S. PATENT DOCUMENTS 11,481,626 B2 * 10/2022 Das ........................ G06N 3/094
11,494,597 B2 11/2022 Nadamuni Raghavan et al.
(Continued)

FOREIGN PATENT DOCUMENTS

WO WO-2019178702 A1 * 9/2019 ........... G06V 10/774

OTHER PUBLICATIONS

Multi-Task Deep Transfer Learning Method for Guided Wave-Based Integrated Health Monitoring Using Piezoelectric Transducers, Bin Zhang et al., IEEE, 2020, pp. 14391-14400 (Year: 2020).*
(Continued)

*Primary Examiner* — Jayesh A Patel
(74) *Attorney, Agent, or Firm* — Andrew J. Tibbetts; Samuel S. Stone; Greenberg Traurig, LLP

(57) ABSTRACT

An encoder is trained together with a perception component based on a training set comprising unannotated sensor data sets and annotated sensor data sets in a sequence of multiple training steps. Each training step comprises: in a first phase of the training step, updating the set of encoder parameters based on the unannotated sensor data sets, with the aim of optimizing a self-supervised loss function, without updating the set of task-specific parameters of the perception component, and in a second phase of the training step, updating the set of task-specific parameters based on the annotated sensor data sets, with the aim of optimizing a task-specific loss function, wherein the encoder as updated in the first phase of that training step processes a data representation of each annotated sensor data set to extract features therefrom, wherein the perception component processes the extracted features to compute an output therefrom, and wherein the task-specific loss is defined on the output and the associated annotation for each annotated sensor data set for learning a desired perception task. In performing the sequence of
(Continued)

multiple training steps, the method alternates repeatedly between the first phase and the second phase.

20 Claims, 19 Drawing Sheets

(56) References Cited

U.S. PATENT DOCUMENTS

| | | | | |
|---|---|---|---|---|
| 11,663,486 | B2 * | 5/2023 | Sun | G06F 18/2113 706/12 |
| 2017/0304732 | A1 | 10/2017 | Velic et al. | |
| 2019/0383904 | A1 * | 12/2019 | Harrison | G01S 13/931 |
| 2021/0012166 | A1 | 1/2021 | Braley et al. | |
| 2021/0096241 | A1 | 4/2021 | Bongio Karrman et al. | |
| 2021/0192363 | A1 * | 6/2021 | Kolouri | G06N 3/045 |
| 2021/0326751 | A1 * | 10/2021 | Liu | G06F 18/24 |
| 2021/0327029 | A1 | 10/2021 | Chen et al. | |
| 2021/0406674 | A1 | 12/2021 | Wu et al. | |
| 2022/0156525 | A1 * | 5/2022 | Guizilini | G06N 3/0464 |
| 2023/0214654 | A1 | 7/2023 | Park et al. | |
| 2025/0013912 | A1 * | 1/2025 | Jansson Minne | G06N 3/0455 |

OTHER PUBLICATIONS

A Simple Framework for Contrastive Learning of Visual Representations, Ting Chen et al., arXiv, Jul. 2020, pp. 1-20 (Year: 2020).*

Adaptive Deep Visuomotor Representations with Weak pairwise Constraints, Eric Tzeng et al., arXiv, 2017, pp. 1-16 (Year: 2017).*

International Search Report; PCT/EP2022/051205; Date: May 25, 2022; By: Authorized Officer: Grigorescu, Simona.

Xie Saining et al, "PointContrast: Unsupervised Pre-training for 3D Point Cloud Understanding", Dec. 3, 2020 (Dec. 3, 2020), Computer Vision—ECCV 2020 : 16th European Conference, Glasgow, UK, Aug. 23-28, 2020 : Proceedings; [Lecture Notes in Computer Science ; ISSN 0302-9743], pp. 574-591; ISBN: 9783030585945; Sections 3.2, 3.4, 3.4, and 4.3; Algorithm 1;abstract.

Bozorgtabar Behzad et al, "SynDeMo: Synergistic Deep Feature Alignment for Joint Learning of Depth and Ego-Motion", 2019 IEEE/CVF International Conference on Computer Vision (ICCV), IEEE, Oct. 27, 2019 (Oct. 27, 2019), p. 4209-4218.

Eric Tzeng et al, "Adapting Deep Visuomotor Representations with Weak Pairwise Constraints", May 25, 2017 (May 25, 2017), URL:https://arxiv.org/pdf/1511.07111.pdf.

Bin Cheng et al, "S^3Net: Semantic-Aware Self-supervised Depth Estimation with Monocular Videos and Synthetic Data", arxiv.org, Cornell University Library, 201 Olin Library Cornell University Ithaca, NY 14853, Jul. 29, 2020 (Jul. 29, 2020).

Ting Chen et al, "A Simple Framework for Contrastive Learning of Visual Representations", arxiv.org, Cornell University Library, 201 Olin Library Cornell University Ithaca, NY 14853, Jul. 1, 2020 (Jul. 1, 2020).

Zhang Bin et al, "Multi-Task Deep Transfer Learning Method for Guided Wave-Based Integrated Health Monitoring Using Piezoelectric Transducers", Jul. 21, 2020 (Jul. 21, 2020), vol. 20, No. 23, p. 14391-14400.

Wenhao Wang et al, "DomainMix: Learning Generalizable Person Re-Identification Without Human Annotations", arxiv.org, Cornell University Library, 201 Olin Library Cornell University Ithaca, NY 14853, Nov. 24, 2020 (Nov. 24, 2020).

U.S. Appl. No. 18/272,916, filed Jul. 18, 2023, Redford et al.

U.S. Appl. No. 18/272,849, filed Jul. 18, 2023, Redford et al.

U.S. Appl. No. 18/272,950, filed Jul. 18, 2023, Redford et al.

European Examination Report from related European Application No. 22704296.7, dated Jun. 28, 2024 (7 pages).

Comer Joseph F et al: "SAR automatic target recognition with less labels", SPIE Proceedings [Proceedings of SPIE ISSN 0277-786X], SPIE, US, vol. 11394, Apr. 24, 2020 (Apr. 24, 2020), pp. 113940Q-113940Q, XP060132528, DOI: 10.1117/12.2564875 ISBN: 978-1-5106-3673-6.

U.S Office Action dated Aug. 8, 2025, from related U.S. Appl. No. 18/272,849.

Beker et al, Monocular Differentiable Rendering for Self-Supervised 3D Object Detection, arXiv:2009.14524v1 (Year: 2020).

Cosma et al, Self-Supervised Representation Learning on Document Images, DAS 2020: IAPR International Workshop on Document Analysis Systems (Year: 2020).

Chen et al, Multi-View 3D Object Detection Network for Autonomous Driving, CVPR (Year: 2017).

Yang et al, PIXOR: Real-time 3D Object Detection from Point Clouds, CVPR (Year: 2018).

U.S Office Action dated Jan. 16, 2026, from related U.S. Appl. No. 18/272,849.

Zakharov, et al., Autolabeling 3D Objects with Differentiable Rendering of SDF Shape Priors, pp. 12224-12233 In CVPR (Year: 2020).

U.S Office Action dated Oct. 23, 2025, from related U.S. Appl. No. 18/272,916.

Yingzi Ma, Self-Supervised Learning of 3D Point Clouds via Feature Transformation and Rotation Prediction, Nov. 2022, 2022 International Conference on Electrical, Computer, Communications and Mechatronics Engineering (Year: 2022).

Qiangeng Xu et. al., Grid-GCN for Fast and Scalable Point Cloud Learning, 2020, Proceedings ofthe IEEE/CVF Conference on Computer Vision and Pattern Recognition, pp. 5661-5670 (Year: 2020).

Michael Goersele et. al., Ambient Point Clouds for View Interpolation, Jul. 2010, SIGGRAPH' 10: ACM SIGGRAPH 2010 papers, article No. 95, pp. 1-6 (Year: 2010).

Haoming Lu et. al., Deep Learning for 3D Point Cloud Understanding: A Survey, Sep. 2020, Computer Vision and Pattern Recognition, Machine Learning (Year: 2020).

* cited by examiner

Regression pretext task

Local Features

104A

Local transformation prediction
$v_i$
Grid cell i
Vector $v_i$
Local transformation prediction
Grid cell i maps to grid cell j
$\theta_{i,j}$
Vector $v_j$
104B
Grid cell i
$v_j$ Local feature extraction and projection Local feature extraction and projection Local features – image 1

Local features – image 1

Local features – image 2

Local features – image 2

Generating positive pairs
(real plus corresponding simulated scenes)

Contrastive learning

Generating positive pairs via 2D object cropping

Contrastive learning

EXTRACTING FEATURES FROM SENSOR DATA

CROSS-REFERENCE TO RELATED APPLICATIONS

This application is the U.S. National Stage application, pursuant to 35 U.S.C. § 371, of PCT International Patent Application No. PCT/EP2022/051205, filed Jan. 20, 2022, designating the United States and published in English, which claims priority under 35 U.S.C. §§ 119 and 365 to Great Britain Patent Application No. 2100732.3, filed Jan. 20, 2021, Great Britain Patent Application No. 2100739.8, filed Jan. 20, 2021, and Great Britain Patent Application No. 2100740.6, filed Jan. 20, 2021. The contents of each of the aforementioned applications are incorporated herein by reference in their entirety.

TECHNICAL FIELD

The present disclosure pertains generally to feature extraction, and in particular to training methods that can learn to extract useful features from sensor data, as well as trained feature extractors that can be applied to sensor data.

BACKGROUND

Broadly speaking, supervised machine learning (ML) aims to learn some function given only examples pairs of inputs and outputs $(\tilde{x}, \tilde{y})$ (the training set $\{(\tilde{x}, \tilde{y})\}$). Here, "$\tilde{x}$" is a training input, and "$\tilde{y}$" is variously termed a label, annotation or ground truth. Denoting an ML model as f(x; w), the model computes an output y=f(x; w) for some input x based on a set of learned parameters w. During training, the aim is to learn values of the parameters w that substantially match the outputs of the ML model, $y=f(\tilde{x}; w)$, to the labels, $\tilde{y}$, across the training set $\{(\tilde{x}, \tilde{y})\}$. The model is said to generalize from the training set, in that, once trained, it can be meaningfully applied to an unlabelled input not encountered during training.

A broad application of ML is perception. Perception means the interpretation of sensor data of one or more modalities, such as image, radar and/or lidar. Perception includes object recognition tasks, such as object detection, object localization and class or instance segmentation. Such tasks can, for example, facilitate the understanding of complex multi-object scenes captured in sensor data. Computer-implemented perception tasks are widely applicable across a range of technical fields. For example, perception is a critical component of autonomous vehicle (AV) systems and advanced driver-assistance systems (ADAS).

State-of-the-art performance on computer-implemented perception tasks has been achieved via machine learning (ML), with many key performance gains attributed to deep convolutional neural networks (CNNs) trained on very large data sets.

Computer vision (CV)—the interpretation of image data—is a subset of perception. Recent years have seen material developments in ML applied to image recognition and other CV tasks. A key benchmark is provided by the ImageNet database, containing millions of images annotated with object classes. Breakthrough performance on the ImageNet challenge was achieved by AlexNet in 2012, a convolutional neural network (CNN) trained on GPU hardware. Since then, CNN architectures have continued to set the bar for state-of-the-art performance for image classification tasks.

A challenge with CNNs and deep networks is the need for large amounts of training data—typically hundreds of thousands or millions of annotated training images are needed to achieve state-of-the-art performance. Moreover, the complexity of the training data increases with the complexity of the task to be learned: for basic image classification (classifying whole images), simple class labels are sufficient; but more involved tasks require more complex annotation, such as annotated bounding boxes for object recognition or per-pixel classifications for image segmentation.

"Shared learning" techniques, such as transfer learning or multi-task learning, go some way to addressing these issues. Shared learning seeks to share learned knowledge across multiple tasks. For example, this may involve the learning of robust feature representations of sensor data (features) that are shared between multiple tasks. Learning of such feature representations may be referred to as "representation learning" or "feature learning".

In transfer learning, an ML system is initially trained on a first task (the "pre-training" or "pretext" phase), and subsequently trained on a second task in a way that incorporates knowledge learned in the training on the first task ("fine-tuning"). Feature leaning occurs in the pre-training phase, and the learned features are used to learn and perform the second task. The first task may be referred to as a "dummy" task because it is often the second task (the desired task) that is of interest in this context. An ML system might comprise a first component, variously termed the encoder, body or feature extractor, and a second component, sometimes termed the head. In high-level terms, the encoder receives an input (such as an image or images), processes the input to extract features, and passes the features to the head, which in turn processes those features in order to compute an output. In pre-training, the encoder may be connected to a "dummy" head, and the dummy head and the encoder might be trained simultaneously on the dummy task using annotated training inputs commensurate with the dummy task. In pre-training, the aim is to match the outputs of the dummy head to the annotations. In computer vision, that first task might be a simple image classification task; although this will generally require a large volume of training data, the form of annotation (per-image class labels) is relatively simple, reducing the annotation burden. Because the encoder and the head are trained simultaneously, it is not only parameters of the head that that are optimized—the encoder also learns parameters for extracting optimal features for the classification task at hand (a form of feature learning). After pre-training, the dummy head might be discarded, and the now-trained encoder connected to a new and as-yet untrained head. In fine turning, the encoder parameters learned in pre-training on the dummy task (e.g., image classification) may be frozen, with only the parameters of the new head being optimised on the desired second task. The desired task could, for example, be an object detection task such as object localization, e.g., bounding box detection (predicting bounding boxes around objects), or image segmentation (predicting individual object pixels), requiring annotated 2D bounding boxes (or object localization ground truth more generally) and annotated segmentation masks respectively. Although the features have been learned through training on the dummy task, the assumption is that, by choosing an appropriate dummy task, the knowledge encoded in the pre-trained encoder weights should be largely applicable to the desired task as well; the features extracted by the pre-trained encoder should, therefore, be useful to the new head in performing the desired task, significantly reducing the amount of training data required to train the new head. For example, once a network has been pre-trained on a suitable classification task, it can be fine-tuned to bounding box detection or image segmentation with only a relatively small number of annotated bounding boxes or annotated segmentation masks. The effectiveness of transfer learning in image processing has been demonstrated on various image processing tasks in recent years.

Multi-task learning is another shared learning approach. Rather than separating pre-training from fine-tuning, in multi-task learning, a machine learning system is trained simultaneously on multiple tasks. In practice, this typically involves some shared encoder architecture—for example, a dummy head and a desired head may each be connected to a shared encoder, with the heads and the encoder trained simultaneously on dummy and desired tasks though optimization of an appropriate multi-task loss.

It will be appreciated that the terms "dummy" and "desired" are merely convenient labels—the terminology does not necessarily imply that the dummy task is trivial or useless (that may or may not be the case). Rather, all that terminology implies some mechanism (including but not limited to transfer learning and multitask learning) by which knowledge learned in training on some first task (the dummy task) is shared in the learning of some second task (the desired task). In this context, the term "feature learning" refers to the training of the encoder (whether through pre-training on the encoder and dummy head, multi-task training on the encoder, dummy head and desired head simultaneously or some any other shared learning approach in which encoder parameters are learned).

In computer vision, many developments in transfer learning have leveraged supervised pre-training on large, manually annotated image sets such as ImageNet. There are various examples of successful transfer learning approaches with ImageNet features; that is, features learned from the 14 million or so "generic" images in the ImageNet database that have been manually annotated in respect of over 20,000 image classes. However, despite those successes, supervised feature learning approaches are inherently limited in their reliance on manually annotated features.

"Self-supervised" approaches seek to address these issues. Self-supervised learning mirrors the framework of supervised learning, but with the aim of removing or reducing the need for manual annotations by deriving the ground truth, $\tilde{y}$, for the dummy task automatically, i.e., given a set of training inputs $\{\tilde{x}\}$, to automatically generate a training set $\{(\tilde{x}, \tilde{y})\}$ for the dummy task without manual annotation. Outside of perception, an example of a successful self-supervised approach is the Word2Vec model the field of Natural Language Processing (NLP). In training, each input, $\tilde{x}$, is a word taken from a training document, and the ground truth, $\tilde{y}$, is derived automatically as a set of adjacent words; in training the task is, therefore, to learn to predict likely adjacent words given an input word. This approach has been demonstrated to be highly effective at learning semantically rich features for words that can then be applied to other tasks such as document classification.

Whilst self-supervised feature-learning tasks have also been explored in computer vision, they have been largely unable to match the performance of pre-training on the manually annotated ImageNet images.

The "SimCLR" architecture is a recent and promising development in self-supervised feature learning for computer vision. For further details, see "A Simple Framework for Contrastive Learning of Visual Representations", Chen et. al. (2020); arXiv:2002.05709, incorporated herein by reference in its entirety. SimCLR adopts a "contrastive learning" approach, where training data is generated automatically via image transformations. A stochastic data augmentation module transforms a given image randomly resulting in two correlated "views" of the image, $\tilde{x}_i$ and $\tilde{x}_j$. Those views are said to be "associated" and constitute a "positive pair". The training also uses "negative" image pairs that are not expected to have any particular association with each other. The self-supervised task is that of identifying positive pairs. That task is encoded in a contrastive loss function that encourages the network to extract similar features for two images of a positive pair, whilst discouraging similarity of features for two images of a negative pair.

SUMMARY

A first aspect herein is directed to a computer-implemented method of training an encoder together with a perception component based on a training set comprising unannotated sensor data sets and annotated sensor data sets, each annotated sensor data set having an associated annotation, the encoder having a set of encoder parameters, and the perception component having a set of task-specific parameters, the method comprising:

performing a sequence of multiple training steps, wherein each training step comprises:

in a first phase of the training step, updating the set of encoder parameters based on the unannotated sensor data sets, with the aim of optimizing a self-supervised loss function, without updating the set of task-specific parameters of the perception component, and in a second phase of the training step, updating the set of task-specific parameters based on the annotated sensor data sets, with the aim of optimizing a task-specific loss function, wherein the encoder as updated in the first phase of that training step processes a data representation of each annotated sensor data set to extract features therefrom, wherein the perception component processes the extracted features to compute an output therefrom, and wherein the task-specific loss is defined on the output and the associated annotation for each annotated sensor data set for learning a desired perception task;

whereby, in performing the sequence of multiple training steps, the method alternates between the first phase and the second phase, thereby interleaving the training of the perception component with the training of the encoder.

In other words, the training alternates repeatedly between the first and second phases.

In embodiments, the training method can be applied with an existing contrastive learning approach in the first phase. Alternatively, various novel self-supervised mythologies are disclosed herein, which can be implemented in the first phase. In general, any self-supervised feature learning approach may be interleaved with supervised learning on the annotated training inputs.

In a conventional pre-training/fine-tuning approach, encoder weights/parameters would be learned initially entirely via self-supervised training, independently of the ultimately desired task. In the fine-tuning phase, the encoder weights would be frozen. The perception component would receive and process features from the frozen encoder, and be trained independently via conventional supervised training. This conventional set up is prone to overfitting, whereby the encoder learns 'too much' on the artificial self-supervised task, to the detriment of the perception component's performance at inference. The present approach avoids such overfitting, by interleaving the self-supervised encoder training with the supervised training of the perception component on the annotated inputs.

In some embodiments, the encoder parameters may be updated at least twice in each training step: at least once on the self-supervised loss, with at least one further update on the supervised, task-specific loss. In this manner, the encoder is trained through a combination of self-supervised learning and supervised learning on the annotated training inputs.

Each update may be an iteration of a structured training method, such as gradient descent or gradient ascent (e.g. implemented via backpropagation), that is applied to the self-supervised loss in the first phase of each training step and to the supervised, task-specific loss in the second phase of each training step.

In SimCLR and other existing contrastive learning approaches, given a set $\{\tilde{x}_k\}$ that includes some positively paired inputs $\tilde{x}_i$ and $\tilde{x}_j$, the task is to identify (predict) the correct $\tilde{x}_j$ given $\tilde{x}_i$. The contrastive loss encodes only binary relationships between examples in the training set: two inputs either constitute a positive pair (because the inputs are associated in the above sense) or a negative pair (because the inputs have no particular relation to each other), and the aim is to train the system to distinguish between those two possibilities. This resembles a classification task where the aim is to predict some class label $\tilde{y}_j$ for a given input $\tilde{x}_i$. In embodiments, such an approach may be used in the first phase. Novel methods for generating positive training pairs (or training examples more generally) are described herein, and existing methodologies may also be used.

In other embodiments, a novel regression-based self-supervised learning approach may be used in the first phase. The regression-based approach also exploits known associations between training inputs of a training set. A positive training example refers to two or more training inputs that are associated in the sense of discernibly corresponding to the same set of sensor data (correlation) and being related to each other by at least one transformation. The transformation could be a spatial/geometric transformation such as rotation, cropping, resizing etc., or a noise transformation such as colour distortion, blur etc., or any combination thereof.

Such techniques can be applied with any transformation that is parameterized by at least one numerical value. Features are learned via training on a dummy regression task of predicting the numerical value(s) that parameterize the transformation between associated training inputs. In such embodiments, the aim is not simply to learn to identify associated training inputs, but rather to learn to quantify the relationship between associated training inputs based on their respective features. This task is encoded in a self-supervised regression loss.

In embodiments, the self-supervised loss function may be defined on positive training examples, each positive training example comprising at least two associated data representations of the same sensor data set.

The self-supervised loss function may be a contrastive loss function that is optimized in the first phase with the aim of identifying associated data representations.

As another example, the at least two data associated representations may be related by a transformation parameterized by at least one numerical transformation value. The encoder may extract respective features from the at least two data associated representations of each positive training example. At least one numerical output value may be computed from the extracted features. The self-supervised loss function may be a regression loss function that encourages the at least one numerical output value to match the at least one numerical transformation value parameterizing the transformation.

A projection component may project features extracted by the encoder from a feature space into a projection space. The self-supervised loss may be defined in the projection space, and a set of projection parameters of the projection component may be updated in the first phase simultaneously with the set of encoder parameters.

The set of encoder parameters may be frozen in the second phase.

Alternatively, the set of encoder parameters may be further updated in the second phase based on the task-specific loss, simultaneously with the set of perception parameters.

A single update may be applied to the set of encoder parameters in the first phase of each training step, and a single update may be applied to the set of perception parameters in the second phase of each training step. Each update may, for example, be a gradient descent or ascent iteration.

Alternatively, multiple updates may be applied to the set of encoder parameters in the first phase of each training step, and/or multiple updates may be applied to the set of perception parameters in the second phase of each training step.

A different number of updates may be applied in the second phase than the first phase.

For example, a greater number of updates are applied in the second phase than the first phase.

Each data representation may for example be an image or voxel representation.

Each data representation may be an image or voxel representation of a 2D or 3D point cloud.

Each sensor data set may comprise 3D sensor data.

In the first phase of each training step, the set of encoder parameters may be updated based on the annotated and unannotated sensor data sets, and the self-supervised loss function may be independent of the annotations.

A further aspect herein provides a computer system comprising and encoder and a perception component, each trained in accordance with the method of the first aspect or any embodiment thereof, with the encoder configured to receive an input sensor data representation and extract features therefrom, and the perception component configured to use the extracted features to interpret the input sensor data representation.

A further aspect herein provides training computer program configured, when executed on one or more computer processors, to implement the method.

A dummy task that more closely resembles the desired task may yield better features for the purpose of the desired task. Better features, in turn, can improve the performance and/or reduce the training requirements for the desired task. A motivation for the present regression-based self-supervised task is to learn representations that are better for other desired tasks that are also regression-based, such as object localization (predicting object position, pose and/or size/extent). For example, it might be that the desired task is pose detection; that is, predicting the pose (orientation) of some object captured in a training input based on features extracted by an encoder. This desired task can be naturally formulated as a regression task with respect to ground truth object poses, e.g., using a conventional supervised approach on a relatively small set of manually annotated training data. In this context, to train the encoder, a large training set may be generated that includes associated training inputs that are related by rotation, and the dummy regression task might be to predict a relative rotation angle between associated training inputs. Compared with a conventional contrastive learning task, this dummy task more closely resembles the desired task (because both tasks are formulated as regression tasks with respect to angle) and may therefore provide better features for the latter. The self-supervised regression loss may encode the numerical value(s) parameterizing the transformation between associated training inputs (e.g., rotation angle) and causes the transformation prediction component to try to predict that value(s) from the extracted features.

In the above, the term data representation refers to some lower-level representation of the sensor data or some transformed version thereof, and includes, for example, image, point cloud, voxel or mesh representations and the like. The term "input" is used as shorthand for such a data representation unless otherwise indicated. By contrast, a feature representation refers to some higher-level representation extracted by the encoder. When the term representation is used without modification, the meaning shall be apparent from the context. Terms such as feature learning and representation learning are used as shorthand to refer to the training of the encoder based on the dummy task unless otherwise indicated.

A second aspect herein provides an encoder trained in accordance with the method of the first aspect or any embodiment thereof.

A third aspect herein provides a computer system comprising such an encoder and a perception component. The encoder is configured to receive an input sensor data representation and extract features therefrom, and the perception component is configured to use the extracted features to interpret the input sensor data representation.

The perception component be configured to perform a regression task on the extracted features.

A fourth aspect herein provides a training computer program configured, when executed on one or more computer processors, to implement the method of the first aspect or any embodiment thereof.

BRIEF DESCRIPTION OF FIGURES

For a better understanding of the present disclosure, and to show how embodiments of the same may be carried into effect, reference is made by way of example only to the following figures in which.

DETAILED DESCRIPTION

As discussed, shared learning approaches seek to learn feature representations that generalize to other tasks. Various approaches to self-supervised learning are described, which may be implemented in a novel form of joint training method that alternates between self-supervised learning using unannotated training inputs and supervised learning on annotated training inputs.

The training method can be applied with a conventional contrastive learning approach in the first phase, or one of the novel self-supervised methods disclosed herein, or any other self-supervised feature learning approach that is interleaved with supervised learning on the annotated training inputs.

In a conventional pre-training/fine-tuning approach, encoder weights/parameters would be learned initially entirely via self-supervised training, independently of the ultimately desired task. In the fine-tuning phase, the encoder weights would be frozen. The perception component would receive and process features from the frozen encoder, and be trained independently via conventional supervised training. This conventional set up is prone to overfitting, whereby the encoder learns 'too much' on the artificial self-supervised task, to the detriment of the perception component's performance at inference. The present approach avoids such overfitting, by interleaving the self-supervised encoder training with the supervised training of the perception component on the annotated inputs.

In some embodiments, the encoder parameters may be updated at least twice in each training step: at least once on the self-supervised loss, with at least one further update on the supervised, task-specific loss. In this manner, the encoder is trained through a combination of self-supervised learning and supervised learning (on the annotated training inputs).

Note, that in this context, 'training step' refers to an interval covering at least one encoder update, and at least one update of the perception component. Where gradient ascent or descent is used, a training step spans a minimum of two gradient updates (at least one self-supervised gradient update and at least one supervised gradient update).

Each update may be an iteration of a structured training method, such as gradient descent or gradient ascent (e.g.

implemented via backpropagation), that is applied to the self-supervised loss in the first phase of each training step and to the supervised, task-specific loss in the second phase of each training step.

Figure 10:
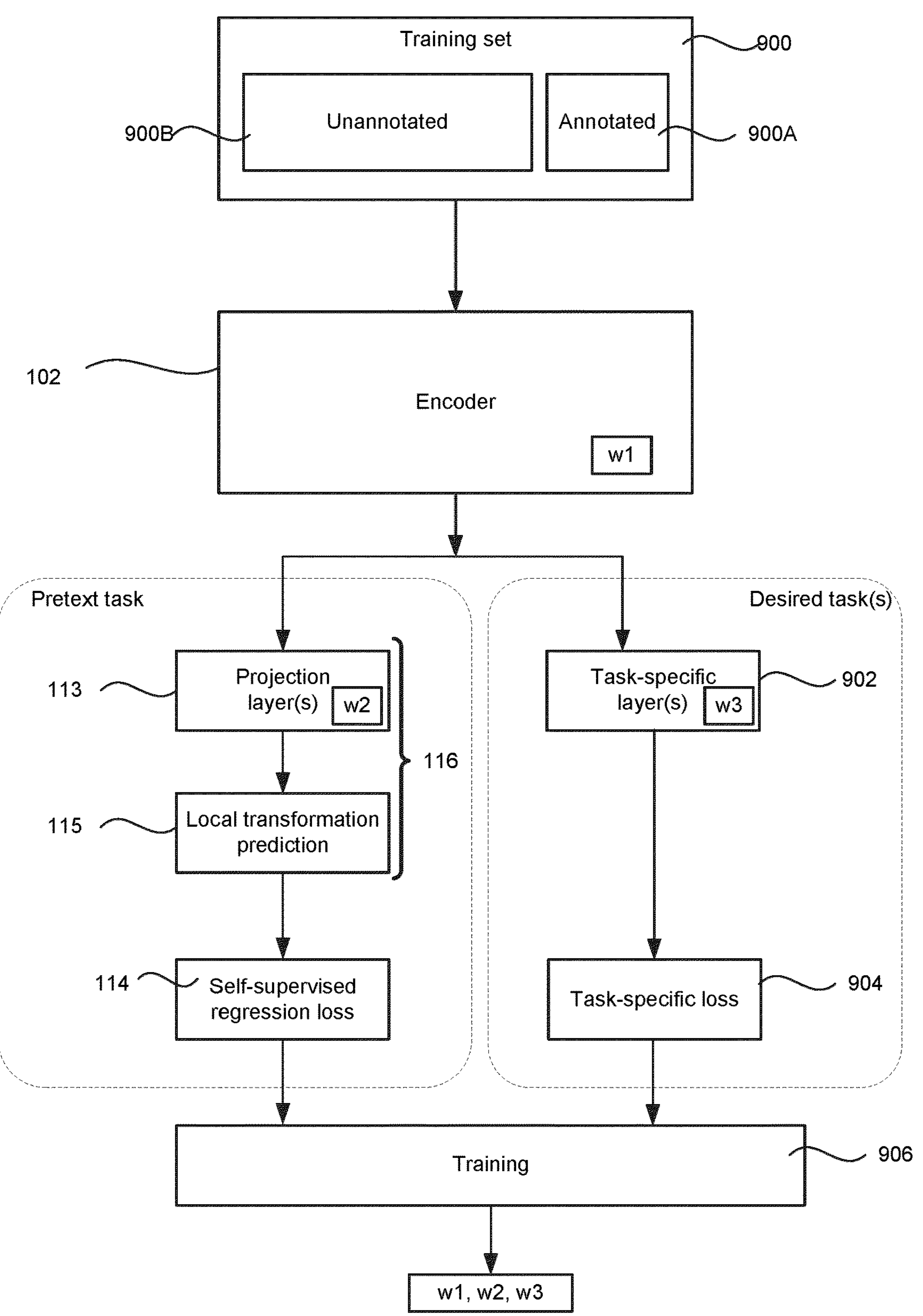
FIG. 10 shows a block diagram for an interleaved training architecture.

FIG. 10 shows an example of a possible training architecture. In this example, instead of separate pre-training/fine-tuning phases, the training on the pretext task and the training on a desired task are interleaved (that is, the training alternates repeatedly between self-supervised updates and supervised updates). The pretext and desired tasks are trained on a common training set 900 in this example. However, only a relatively small subset 900A of the training set 900 is annotated with ground truth for the desired task (e.g., ground truth bounding boxes derived via manual annotation); the remaining subset 900B is unannotated and is only used for the self-supervised pretext training.

An encoder 102, having encoder weights $w_1$, is shown connected to a "dummy" head 116. A local transformation component 115 of the dummy head 116 is used in the first self-supervised approach described below, but not in the second and third approaches. The encoder 102 extracts features from sensor data inputs.

A projection component 113, having projection weights $w_2$ is shown. The operation of the projection component 113 is described below. In brief, the component 113 is a trainable component that projects extracted features into a projection space on which a self-supervised loss 114 is defined.

Additionally, the encoder 102 is also connected to one or more task-specific layer(s) 902 of a desired head, having learnable task-specific weights $w_3$. A conventional supervised (task-specific) loss 904 may be defined on the desired task(s), with the aim of minimizing the task-specific loss 904 with respect to the annotated subset 900A of the training data 900. A training component 906 is shown, which implements the training method as follows.

Training is performed in a sequence of training steps, each having two phases. In the first phase of each training step, a single update is applied to encoder weights $w_1$ and projection weights $w_2$ with the aim of optimizing the self-supervised loss 114 over the full training set 900; then, in the second phase, a single update is applied to the task-specific weights $w_3$ with the aim of optimizing the task-specific loss 904 over the annotated subset 900A of the training set 900. Alternatively, multiple updates may be applied in either or both of the phases.

In other words, the training is performed with some training iterations on the self-supervised loss 114, interleaved with training iterations on the supervised loss, thereby defining an alternate training procedure.

In the second phase (that is, in the training iterations with supervised loss), the encoder weights $w_1$ may be frozen, or the encoder weights $w_1$ may be updated for a second time based on the task-specific loss 904, simultaneously with the task-specific weights $w_3$. Over multiple training steps, the method alternates repeatedly between the first (self-supervised) and second (supervised) phases. In this manner, the task-specific training is "interleaved" with the pretext training.

This interleaved training approach can be useful to discourage a form of overfitting that can arise from a conventional pre-training/fine-tuning approach, whereby the encoder 102 learns 'too much' on the artificial self-supervised task, to the detriment of performance on the desired task(s).

The self-supervised phase is performed without updating the perception head 902, independently of the task-specific loss function 904 any independently of annotations in the training set. The method may be applied to a training set with a mixture of annotated and unannotated training inputs, in which case the self-supervised phase does not discriminate between these, and the annotations are ignored until the supervised loss 904 is applied in the supervised phase. The supervised phase is based on the supervised, task-specific loss function 114 applied to the annotated inputs only, and is independent of the self-supervised loss 114.

Each update may, for example, be applied via a single iteration of gradient descent (or ascent) via backpropagation. With 100 iterations in total, these may be evenly split between the self-supervised and supervised phases. For example, the method may alternate between a single update in each phase (so 50 training steps in total, each with a single update in phase one and a further single update in phase 2), or some other number of updates in each phase before switching to the other loss (e.g. two to five updates or so).

In other words, with a 50:50 ratio between self-supervised iterations and supervised iteration, the e.g. every 1st, 3rd, 5th . . . iteration can be self-supervised and the rest (2nd, 4th, 6th . . . ) supervised. The ratio can be pre-defined at the start of training.

In other implementations, the training may not be evenly split. For example, an 20/80 split between training on the pretext task and the desired task may be achieved with a single update in the self-supervised phase (encoder training, e.g. via a single iteration of gradient descent on the self-supervised loss 114) followed by three supervised updates (training iterations) in the supervised phase (e.g. three iterations of gradient descent based on the task-specific loss 904). In that case, the method repeatedly alternates between a single gradient descent iteration on the self-supervised loss function 114 followed by four gradient descent iterations on the task-specific loss 904. An 80/20 split, on the other hand, alternates between four updates on the self-supervised loss 114 followed by a single update on the task-specific loss 904.

Gradient descent (or ascent) is merely one example of a suitable training method that may be used.

Existing self-supervised methods, such as SimCLR, can be used in the first phase. Alternatively or additionally, one or more of the approaches described below can be used individually or in combination.

Regression-Based Self-Supervised Training:

In a first approach to self-supervised learning, the dummy (pretext) task for feature learning is constructed as a self-supervised regression task with respect to a training set. The training set includes training inputs that are associated in the above sense and related by some transformation. The task is one of predicting numerical value(s) parameterizing the transformation between associated training inputs of a positive training example (e.g., positive pair) based on their respective features.

The transformation is used as a pair generation function for generating positive pairs of inputs, but the use of those positive pairs is quite different from conventional contrastive learning in the regression approach described herein.

The dummy task is encoded in a pretext loss, which is self-supervised regression loss (FIG. 1, 114) that penalizes deviation between the numerical output of a dummy regression component (head) and the numerical value(s) parameterizing the transformation for a given positive pair. The features are extracted by an encoder and feed into the dummy regression head (FIG. 1, 116) for computing the numerical output, and the encoder and the dummy regression component are trained together with the objective of substantially optimizing the self-supervised regression loss over a training set. That is, both parameters (wights) of the encoder and parameters of the dummy regression head are tuned in a structured training process with the objective of substantially optimizing the self-supervised regression loss over the training set.

For example, where two inputs of a positive training example are related by rotation or rescaling, the dummy regression task may be to predict a relative angle of rotation, a relative scaling factor, or a relative noise level between associated inputs based on their respective features. This does not require manual annotation if the numerical value(s) are known from the generating of the training set.

For the purposes of illustration, the following examples consider training inputs in the form of image representations of sensor data, i.e., sensor data represented in a structured two-dimensional (2D) pixel array. Note that a 2D image representation does not necessarily imply 2D image data—for example, an RGBD (Red Green Blue Depth) image encodes explicit depth values in the pixels in order to encode 3D image data. Similarly, an image representation is not necessarily restricted to image modalities in the conventional sense. For example, the underlying sensor data could be point cloud data captured using lidar, which is ordered and discretised to generate an image representation of the point cloud. For example, a PIXOR representation of a point cloud is an image representation that encodes a "birds eye view" (BEV) of the point cloud, using occupancy values to indicate the presence of absence of a lidar point and, in some case, height values to fully represent the 3D lidar data (similar to the depth channel of an RGBD image). For further details, see Yang et al, "PIXOR: Real-time 3D Object Detection from Point Clouds", arXiv: 1902.06326, which is incorporated herein by reference in its entirety.

Unless otherwise indicated, the term "image" herein simply means an image representation in this sense and does not necessarily any limitation on the modality of the underlying sensor data. A benefit of using image representations is that many state-of-the-art CNN architectures from computer vision are designed to operate on this type of input. Nevertheless, it will be appreciated that the described techniques can be applied to other data representations, such as voxel, point cloud or mesh representations. For example, PointNet is one example of a convolutional neural network architecture that operates directly on point cloud representations and does not require them to be converted to intermediate image representations. Moreover, many 2D CNN architectures can be extended to operate on 3D voxel representations at the cost of increased resource requirements.

The described examples consider an ML system having a neural network architecture; that is, a computer system programmed to implement a neural network, such as a deep CNN architecture, having an encoder portion (encoder layers, which are typically convolutional) and at least one dummy regression head. In this context, the parameters of the encoder and the dummy regression head comprise weights of the neural network that are applied at the various layers. During pre-training, the network is trained end-to-end, with both the encoder weights and the weights of the dummy regression head being systematically updated with the objective of optimizing a self-supervised pretext regression loss constructed in accordance with the above principles. A desired regression head is trained, e.g., using a conventional supervised approach but with a greatly reduced training set, and operates on features provided by the encoder. Further details of training are described below with reference to FIG. 9.

Figure 1:
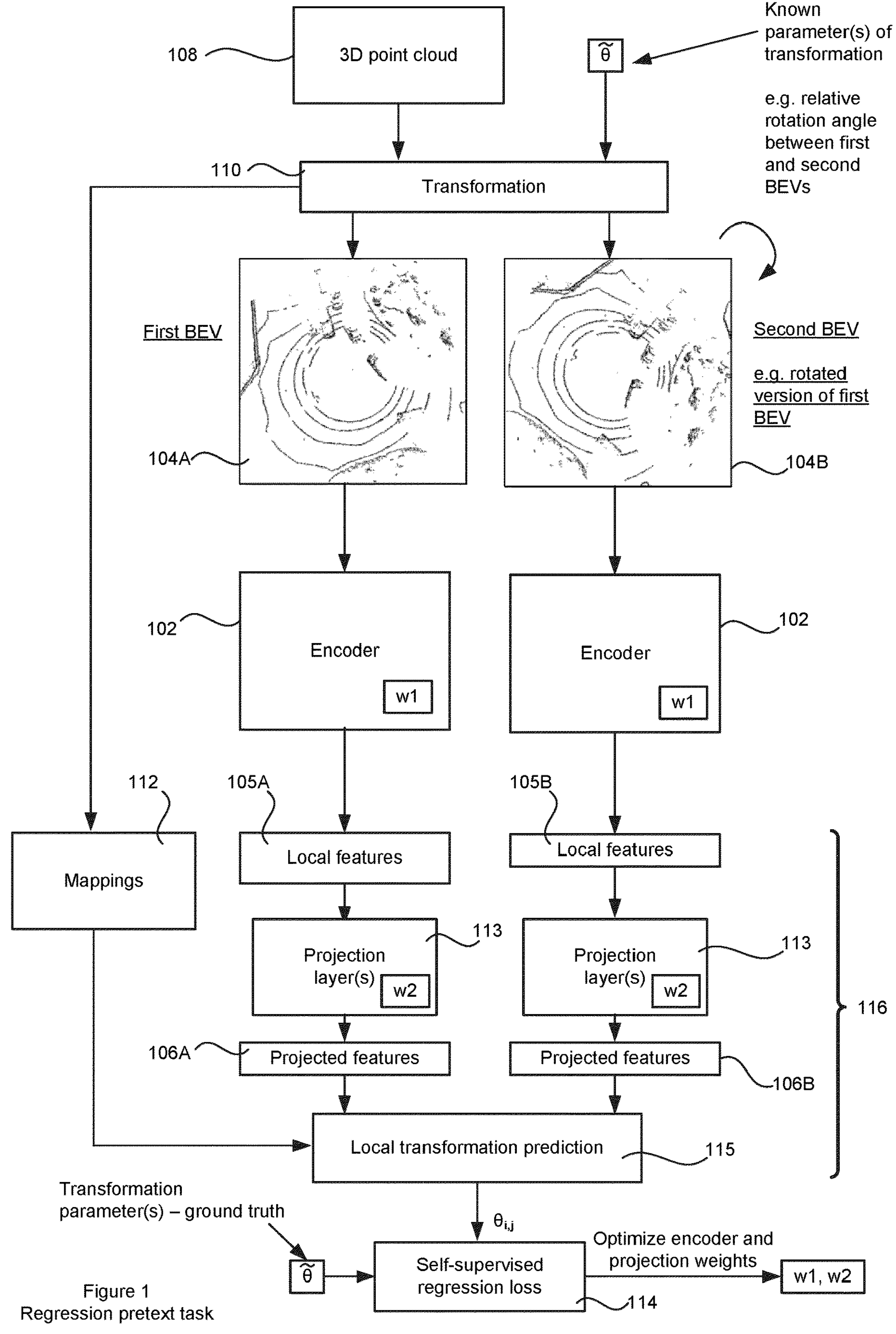
FIG. 1 shows a schematic overview a regression-based pretext training architecture in a first self-supervised training approach.

FIG. 1 schematically illustrates a dummy regression task applied to 3D lidar point clouds based on transformation angle.

The aim is to train an encoder 102 to extract high-quality local features from point clouds that are well suited to other, more useful regression tasks, such as object localization (e.g., bounding box detection, location detection, pose detection etc.).

FIG. 1 shows a 3D point cloud 108 and first and second training images 104A, 104B (that is, discretised 2D representations) of the 3D point cloud 108. Each of the training images 104A, 104B is a BEV image representation of the same 3D point cloud 108, and the training images 104A, 104B are therefore associated in the above sense and constitute a positive pair. The training images 104A, 104B are generated from the 3D point cloud 108 by a transformation 110 applied to the point cloud 108 and provide relatively transformed BEVs of the 3D point cloud 108. Specifically, those views are relatively rotated in the BEV plane by some relative rotation angle rotation angle $\tilde{\theta}$, which is a numerical parameter of the transformation 110.

The first and second training images 104A, 104B are relatively sparse images, in that the majority of their pixels do not correspond to any point in the point cloud 108. Such pixels are said to be unoccupied, whereas pixels that do correspond points in the point cloud 108 are said to be occupied. Each pixel may, for example, have a binary occupancy value for denoting occupancy. When a first pixel in the first training image 104A and a second pixel in the second training image 104B correspond to the same point in the point cloud 108, those first and second pixels correspond to each other. Note that, generally, those pixels will be at different locations in their respective images 104A, 104B because of the relative rotation between those images 104A, 104B. Mappings 112 between regions of the first training image 104A and corresponding regions of the second training image 112 are known from the transformation 110.

The first and second training inputs 102 are each processed by the encoder 102, based on a set of encoder weights $w_1$, in order to extract first and second local features 105A, 105B respectively.

A projection component 113 projects the local features 105A, 105B from a feature space into a projection space to obtain first and second feature projections 106A, 106B for the first and second images 104A, 104B respectively.

Figure 4:
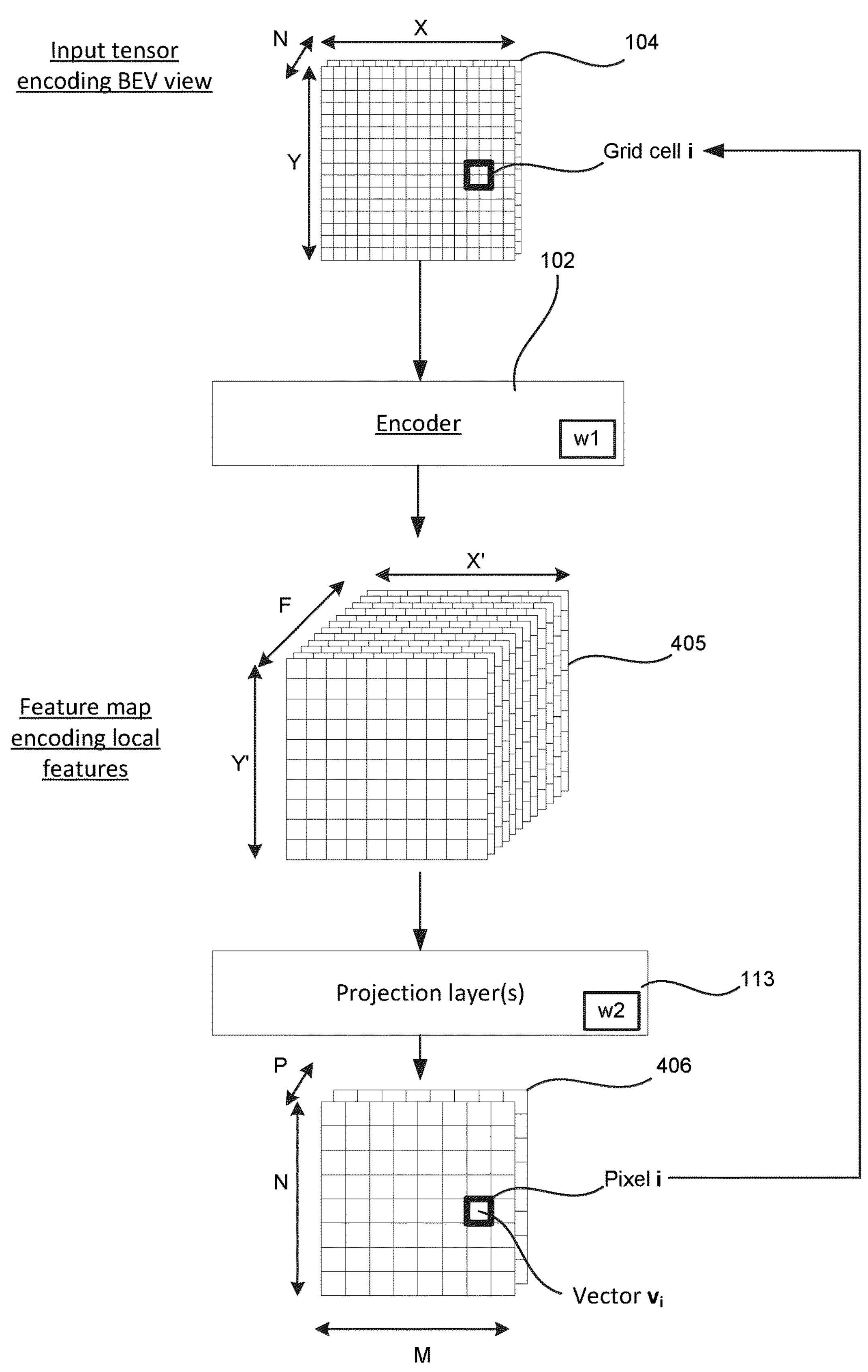
FIG. 4 shows an example encoder and projection layer architecture for regression-based pretext training.
Figure 5:
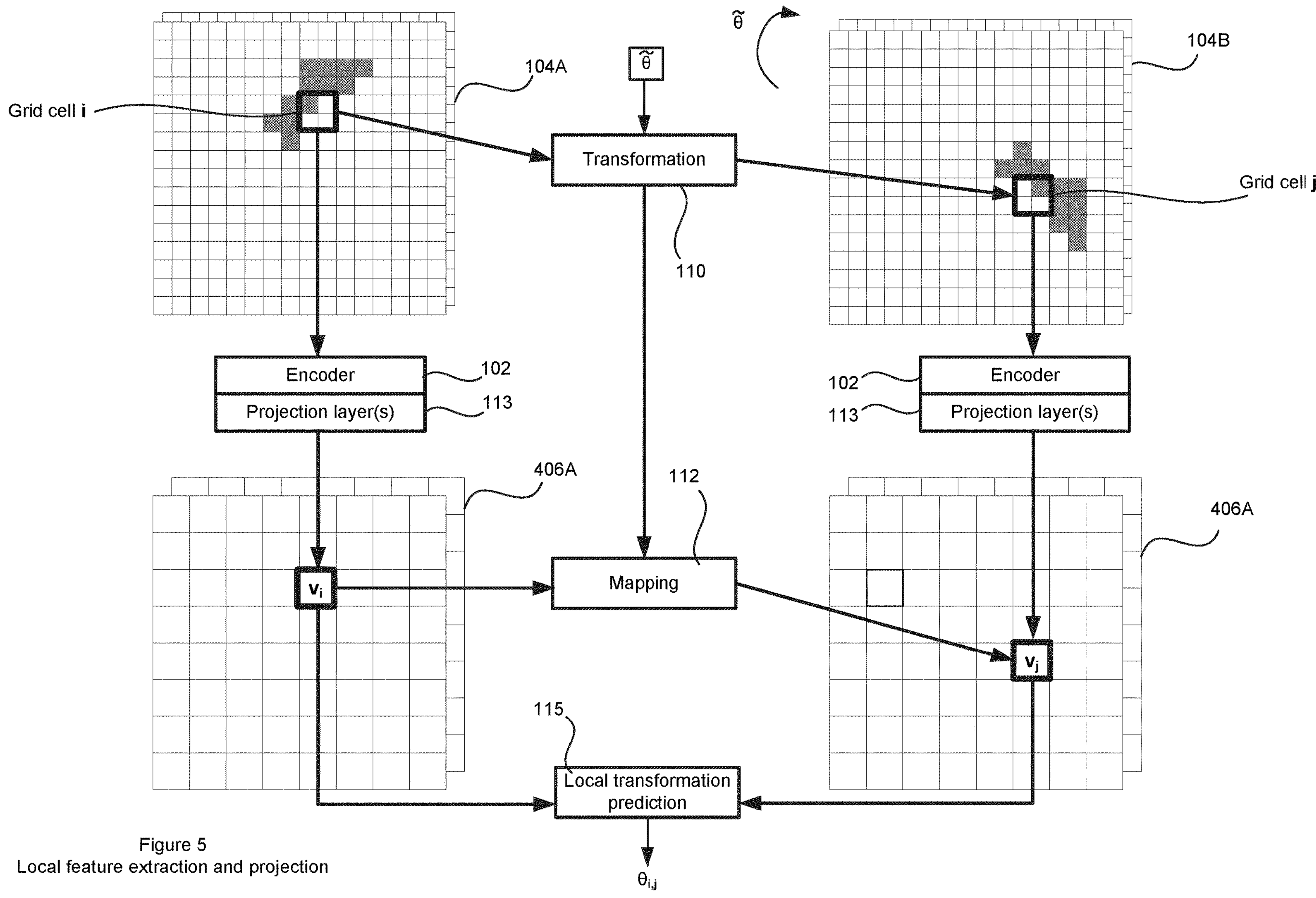
FIG. 5 shows how mappings between spatial locations in paired BEV images may be determined in order to compute local transformation predictions from their respective local features.

FIG. 4 is a schematic block diagram illustrating the relationship between an image 104 and its features in more detail. The image 104 is encoded as an input tensor shown to have spatial dimensions X×Y with N channels. In the simplest case N=1, e.g., for a BEV image representation of a point could with only an occupancy channel. However, N may be greater than one, e.g. N=2 for a BEV image with occupancy and height channels.

In this example, the encoder 102 has a CNN architecture. The local features extracted by the encoder 102 are encoded in a feature map 405, which is a second tensor having spatial dimensions X'×Y' and F channels. The number of channels F is the dimensionality of the feature space. The size of the feature space F is large enough to provide rich feature representations. For example, of the order of a hundred channels might be used in practice though this is context dependent. There is no requirement for the spatial dimensions X'×Y' of the feature map 405 to match the spatial dimensions X×Y if the image 104. If the encoder 102 is architected so that the spatial dimensions of the feature map 405 do equal those of the input image 104 (e.g., using upsampling), then each pixel of the feature map 405 uniquely corresponds to a pixel of the image 104 and is said to contain an F-dimensional feature vector for that pixel of the image 104. When X'<X and Y'<Y, then each pixel of the feature map 405 correspond to larger region of the image 104 that encompasses more than one pixel of the image 104.

The first and second sets of local features 105A, 105B of FIG. 1 are tensor-encoded in this manner.

The encoder 102 computes the feature map 405 through a combination of convolutional and non-linear operations applied within the layers of the encoder 102 based on the encoder weights $w_1$.

The feature projections computed by the projection component are encoded in a projection map 406, which is a third tensor having spatial dimensions M×N and P channels. Again, there is no requirement that the spatial dimensions M×N of the projection map 406 match the spatial dimensions X×Y of the original image 104 or the spatial dimensions X'×Y' of the feature map 405 computed by the encoder 102 (the latter may be referred to as the full feature map 405 to distinguish from the projection map 406). The first and second feature projections 106A, 106B of FIG. 1 are encoded in this way.

The projection component 113 can be implemented as a single layer with projection weights $w_2$. Whilst a single layer is sufficient, multiples layers can be used.

A pixel of the projection map 405 is denoted i and contains a P-dimensional vector $v_i$ (projected vector). Pixel i of the projection map 405 corresponds to a grid cell of the image 104—referred to as grid cell i for conciseness. Grid cell i is a single pixel of the original image 104 when the spatial dimensions of the projection map 405 match the original image 104 but is a multi-pixel grid cell if the projection map 405 has spatial dimensions less than the original image 104. In the following examples, the size of the projection space P=2. In training on the pretext regression task, the vector $v_i$ is interpreted as a vector lying in the BEV plane.

Figure 2:
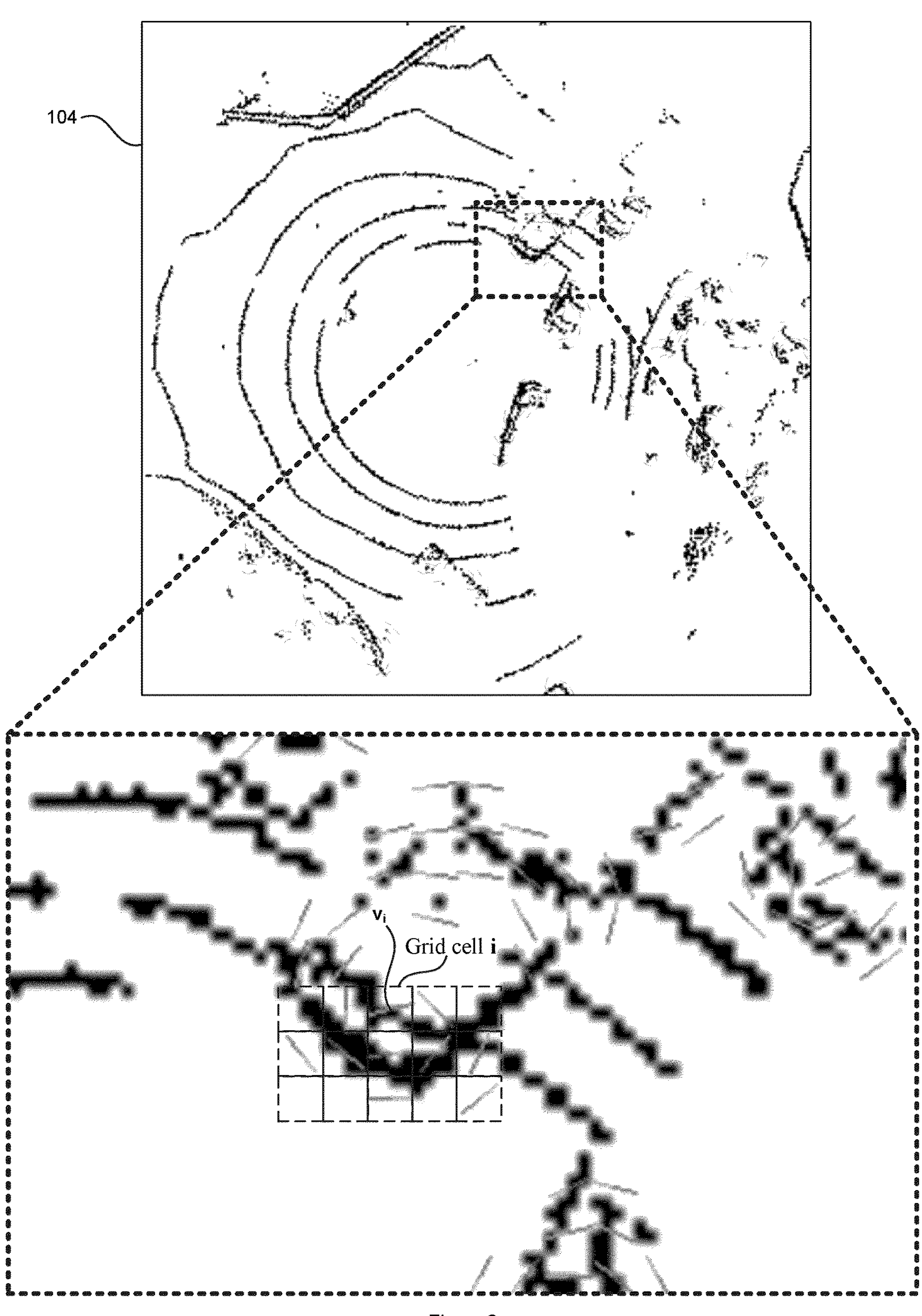
FIG. 2 shows an example birds-eye-view (BEV) representation of a point cloud.

FIG. 2 illustrates the interpretation of the local feature projections using a real example of a lidar point cloud captured in a driving context. The point cloud is encoded as a BEV image and an expanded view of part of the image is shown in the bottom part of FIG. 4. Projected vectors are represented graphically as lines in the BEV plane. The relationship between the vector $v_i$ and grid cell i can be seen (projection vectors are not shown for all grid cells—see below).

The grid cells correspond to individual pixels of the projection map 406 and, in this example, each grid cell i encompasses multiple pixels within the original image 104. Such grid cells are a natural result of down sampling performed on the input image 104 within the network. If desired, upsampling can be used to counter this effect and obtain a higher-resolution feature map 405. However, in practice, a feature resolution of the order depicted in FIG. 2 has been found to yield good local features.

Certain grid cells are ignored (and do not contribute to the self-supervised loss function 114). To determine whether to ignore a grid cell, the image 104 is interpolated (e.g. via bilinear interpolation) into the same sized space as the projection map 405 (M×N). A loss (penalty) is only suffered in those grid cells where the interpolated BEV occupancy is greater than zero. This is one way to account for the relative sparsity of the BEV image 104. However, it will be appreciated that there are other viable ways to selectively ignore grid cells that that contain no or limited information.

Returning to FIG. 1, the first and second local features 105A, 105B are extracted in this manner from the first and second input images 104A, 104B respectively. The local features 105A, 105B are in turn, projected into the projection space by the projection layer(s) 113 to obtain the local feature projections 106A, 106B.

A local transformation prediction component 115 receives the local feature projections 106A, 106B and computes a local transformation prediction $\theta_{i,j}$ for each pair of corresponding grid cells i, j in the first and second images 104A, 104B as follows. In this case, the local transformation prediction $\theta_{i,j}$ is a local rotation angle.

Figure 3:
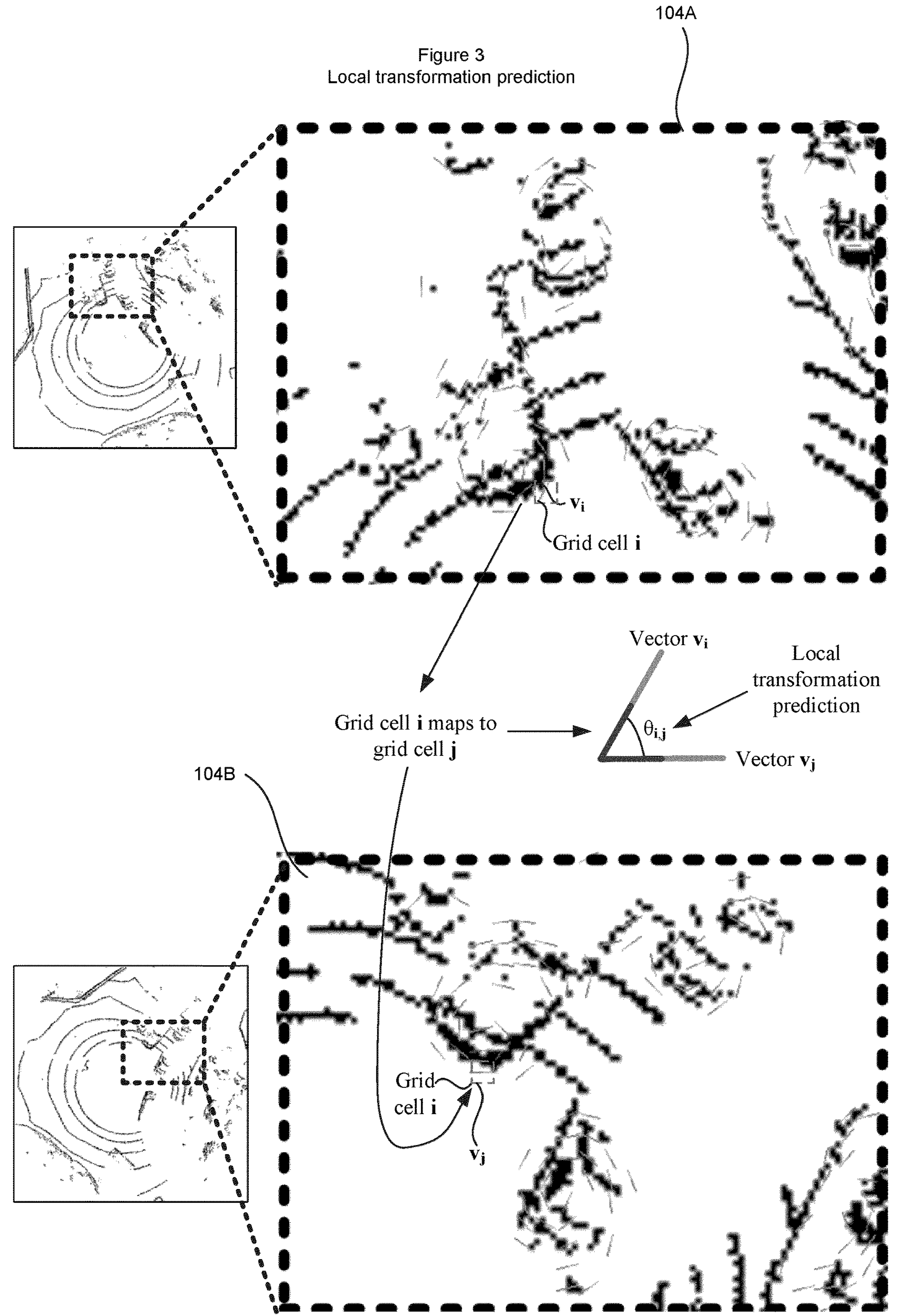
FIG. 3 shows two BEV images of the same point cloud that are related by global rotation and demonstrates how local rotation predictions may be computed based on a comparison of their local features.

With reference to FIG. 3, grid cell i of the first image 104A is known to map to corresponding grid cell j in the second image 104B because the transformation 110 between those images 104A, 104B (parameterized by $\tilde{\theta}$) is known. That is, a mapping from grid cell i in the first image 104A to grid cell j in the second image 104B is determined from the transformation 110 and its parameter(s) $\tilde{\theta}$. The encoder 102 assigns an F-dimensional feature vector to each of those grid cells i, j and the projection layer(s) 113 assigns those grid cells i and j respective vectors $v_i$, $v_j$ in the BEV plane. The local transformation prediction component 115 computes the local rotation angle $\theta_{i,j}$ as the angular separation between those vectors $v_i$, $v_j$ in the BEV plane, as illustrated towards the middle of FIG. 3.

Returning to FIG. 1, such mappings 112 are determined for multiple grid cell pairs between the two images 104A, 104B. For every pair (i, j) of corresponding grid cells in the first and second training images 104A, 104B, the local rotation angle $\theta_{i,j}$ should match the (global) relative rotation angle $\tilde{\theta}$ between the first and second training images 104A, 104B. The pretext loss 114 is therefore constructed to penalize deviation in the local rotation angle $\theta_{i,j}$ from the global rotation angle $\tilde{\theta}$ of the transformation 110:

$$\mathcal{L}_{pre}(\tilde{x}_a, \tilde{x}_b) = \sum_{(i,j)\in M_{\tilde{x}_a,\tilde{x}_b}} d(\theta_{i,j}, \tilde{\theta}), \tag{1}$$

where $\tilde{x}_a$, $\tilde{x}_b$ denote the first and second images 104A, 104B respectively. The notation $T_{\tilde{\theta}}$ denotes the transformation 110 parameterized by $\tilde{\theta}$, with $\tilde{x}_b=T_{\tilde{\theta}}(\tilde{x}_a)$. Here, $M_T\tilde{\theta}$ is a set of mapping (the mappings 112 shown FIG. 1) and $(i, j)\in M_{\tilde{x}_a,\tilde{x}_b}$ denotes a pair of corresponding grid cells, i.e., grid cell i in the first image $\tilde{x}_a$ maps to grid cell j in the second image $\tilde{x}_b$ under the transformation $T_{\tilde{\theta}}$. The set of mappings $M_T\tilde{\theta}$ is determined from the transformation $T_{\tilde{\theta}}$, but also depends on the content of the images $\tilde{x}_a$, $\tilde{x}_b$ because certain pairs of grid cells are ignored, i.e., excluded from $M_{\tilde{x}_a,\tilde{x}_b}$, if they contain no or limited information (see above). Pairs of grid cells that are ignored do not contribute to the pretext loss 114 ($\mathcal{L}_{pre}$) and therefore cannot result in any pretext training penalty. The function d is some difference function (e.g., $d(\theta_{i,j}, \tilde{\theta})=|\theta_{i,j}-\tilde{\theta}|$ or $(\theta_{i,j}-\tilde{\theta})^2$ etc.).

As depicted in FIG. 3, for predicting rotation angle, the local transformation prediction $\theta_{i,j}$ is derived from the projected vectors $v_i$, $v_j$ as $$\theta_{i,j} = \arccos\left(\frac{v_i \cdot v_j}{\|v_i\|\|v_j\|}\right). \tag{2}$$

That is, the local transformation $\theta_{i,j}$ is derived from the dot product of the vector $v_i$ for grid cell i in the first image 104A and the corresponding vector $v_j$ for the second image 104B.

Note, $\|v_i\|=\|v_j\|=1$ for normalized vectors. Whilst the above examples consider a two-dimensional projection space, normalized vectors in a plane may be represented in one dimension as there is only one degree of freedom (it may, nevertheless, be convenient to retain a two-dimensional projection space for normalized vectors as Equation 2 is somewhat simpler to evaluate with two dimensional vectors).

When training on the pretext regression task, the aim is to find parameters (weights) $w_1$, $w_2$ of the encoder 102 and the projection layer(s) 113 that substantially minimize the pretext loss $\mathcal{L}_{pre}$ across the training set.

It is the definition of Equation 2 that forces the interpretation of the projected vectors $v_i$ as lines in the BEV plane (Equation 1 applies more generally to other interpretations—see below). With the definition of Equation 2, the encoder 106 is encouraged to assign local features in a way that encapsulates rotational information. This effect can be observed in FIG. 2—the loss function has caused the encoder 106 to assign local features that "spiral" around an object, encapsulating useful information about not only about its location and extent but also its orientation. As can be observed in the side-by-side comparison of FIG. 3, the collection of local features associated with an object generally rotate with the object and therefore appear to capture useful information about its orientation.

Figure 6:
FIGS. 6 and 7 show expanded views of the example BEV images of FIG. 3.
Figure 6:
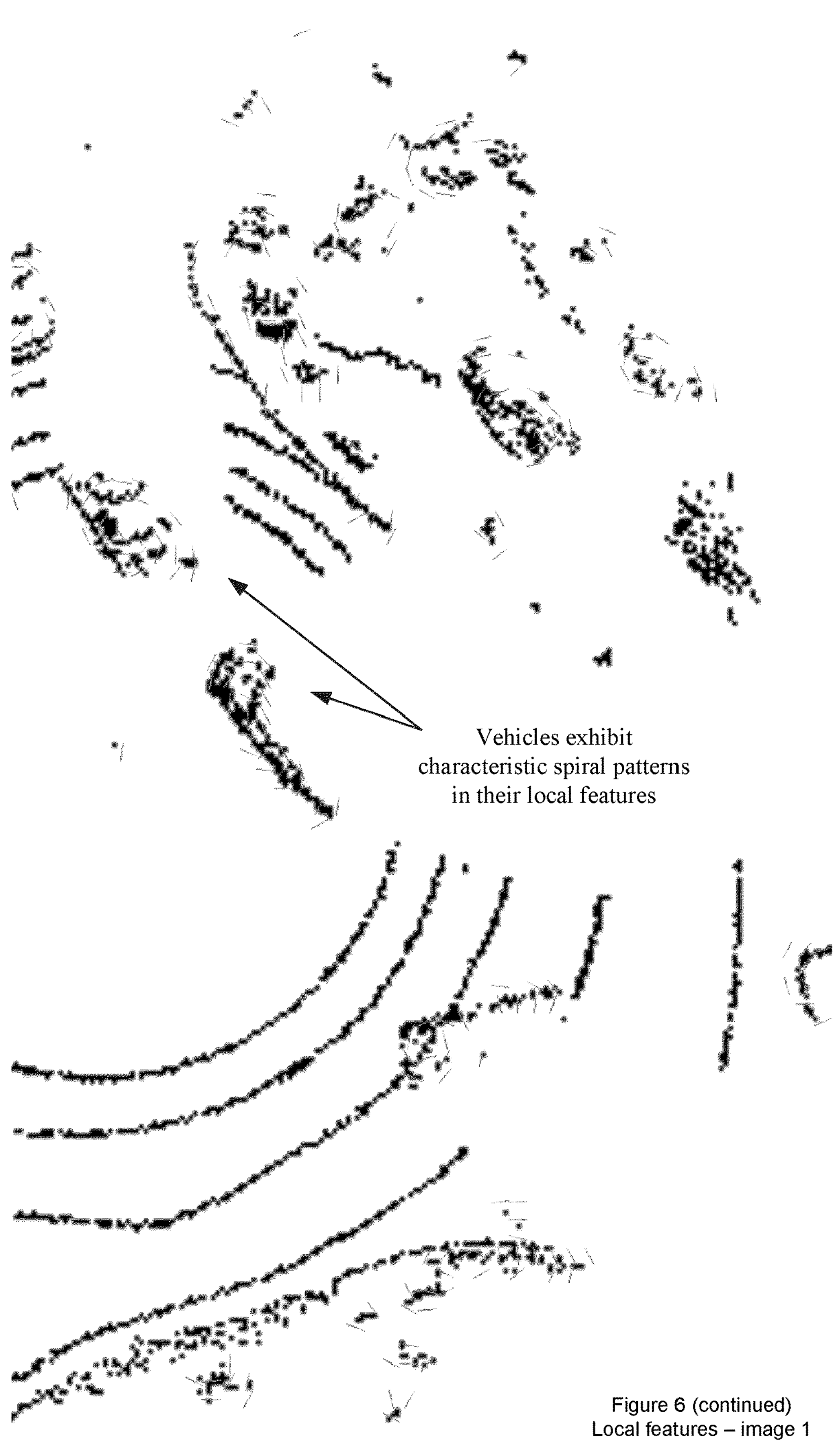
Figure 7:
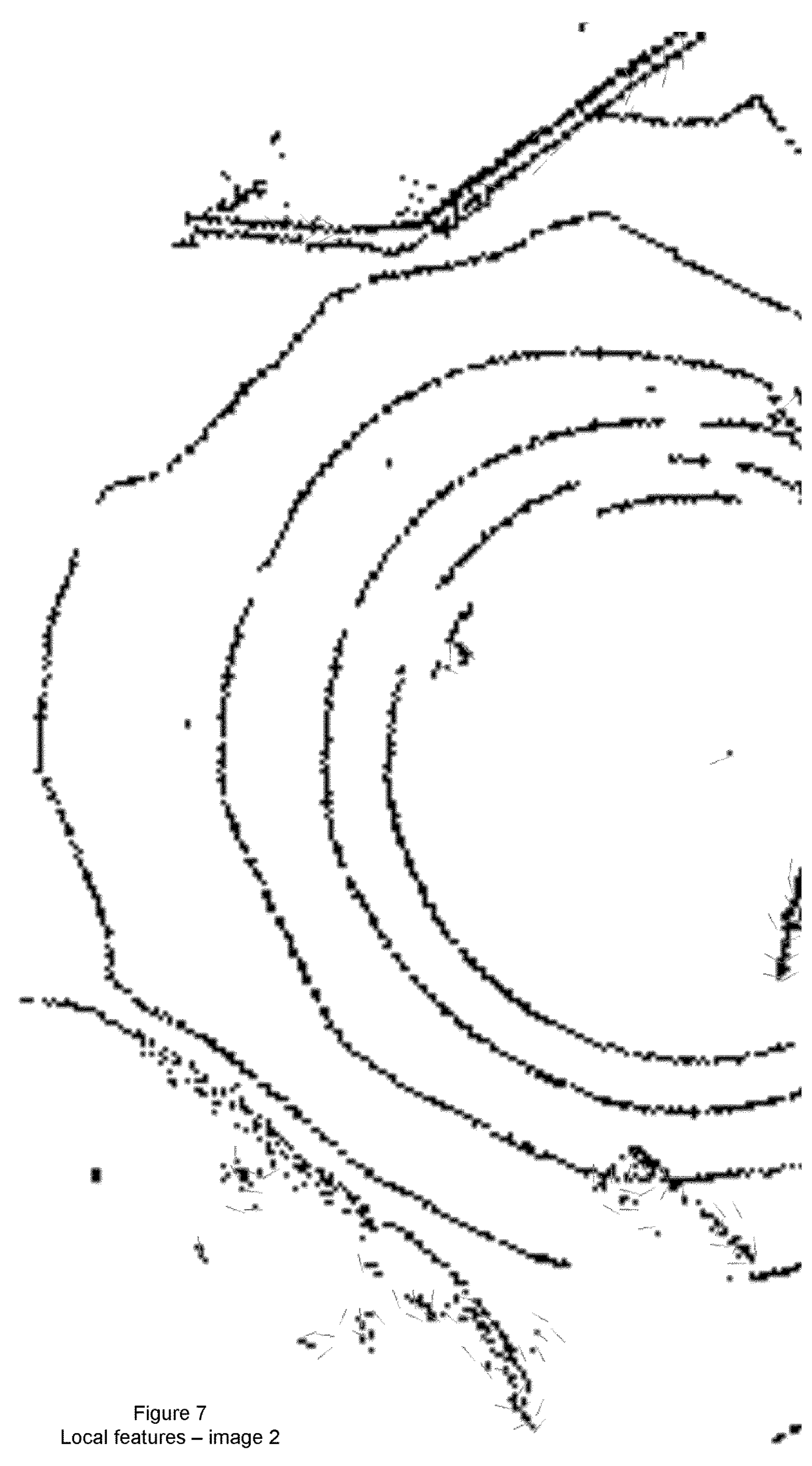
Figure 7:

FIGS. 6 and 7 shows enlarged views of the example first and second images 104A, 104B depicted in FIG. 1, marked with their projected vectors to illustrate these effects across the images as a whole.

The mappings $M_T\tilde{\theta}$ between grid cells in the two images can be determined at different levels of granularity. The above examples consider a course one-to-one mapping from grid cell i in the first image $\tilde{x}_a$ to a single grid cell j in the second image $\tilde{x}_b$. This could be determined, for example, by taking a center point $c_i$ of grid cell i of the first image 104A, identifying a transformed point $c_i'=T_{\tilde{\theta}}(c_i)$ in the second image $\tilde{x}_b$ (the point to which $c_i$ maps under the transformation $T_{\tilde{\theta}}$), and determining the corresponding grid cell j as the grid cell containing the transformed point $c_i'$. Course mapping of this nature may well be sufficient in practice. However, it may be possible to improve performance on the pretext task $\mathcal{L}_{pre}$ with more accurate mappings in some cases.

Figure 8:
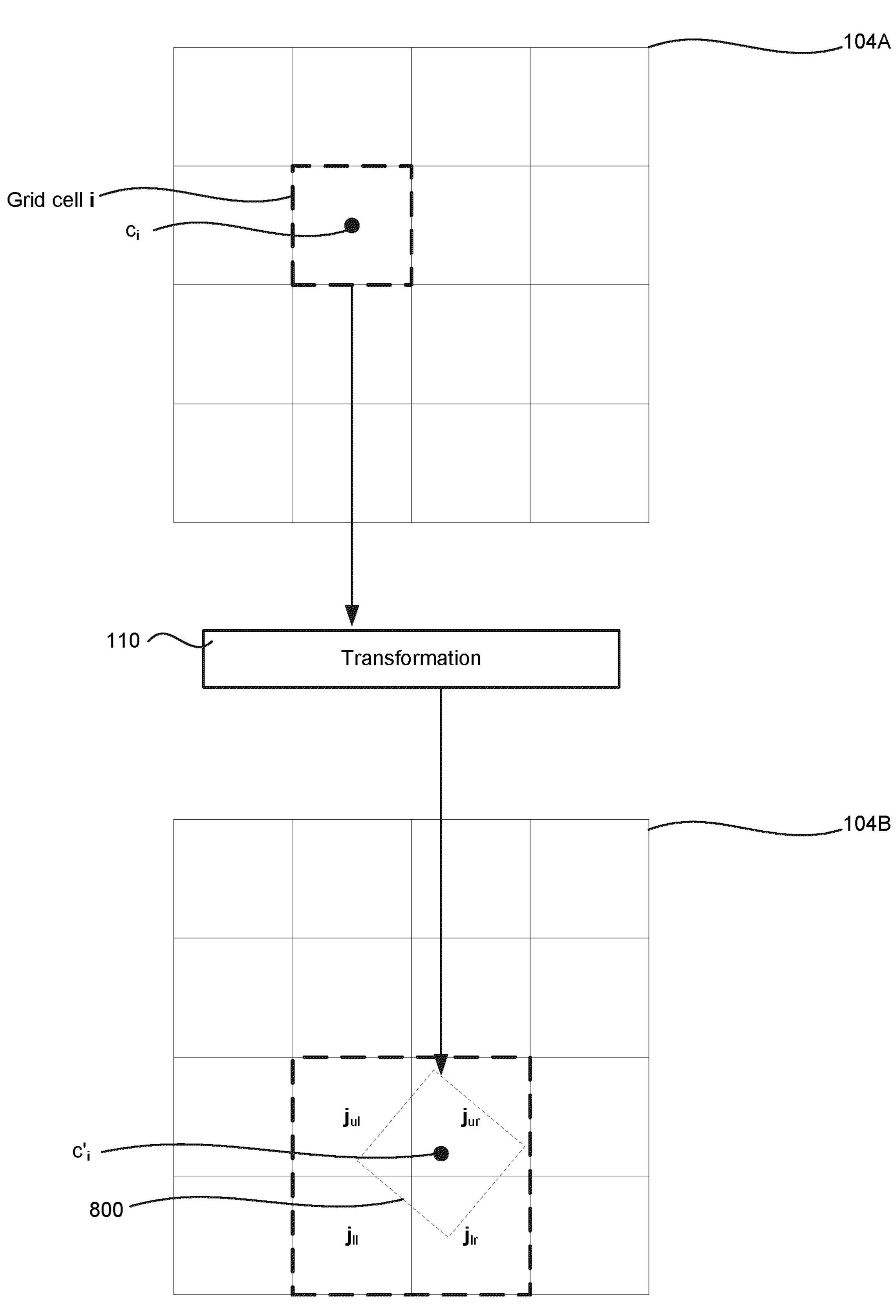
FIG. 8 shows a grid cell in a first BEV image mapped to a region of a second BEV image under an example rotation transformation.

FIG. 8 illustrates how mappings of different granularities may be determined. As can be seen, given a center point $c_i$ of grid cell i in the first image 104A, the transformed point $c_i'=T_{\tilde{\theta}}(c_i)$ will not, in general lie at the center of any grid cell in the second image 104B ($\tilde{x}_b$). A region 800 of the second image 104B is marked, which is the region to which grid cell i of the first image 104A maps under the transformation $T_{\tilde{\theta}}$ (denoted in mathematical notation as $T_{\tilde{\theta}}(i)$). As in the earlier examples, FIG. 8 considers a rotation of the first image 104A. In general, this region 800 may intersect up to four grid cells of the second image 104B, denoted $\{j_{ul}, j_{ur}, j_{ll}, j_{lr}\}$. The upper-right grid cell $j_{ur}$ is shown to contain the transformed point $c_i'$ in this example. The coarse mapping described above simply takes $j=j_{ur}$, in which case the corresponding vector in the second image is simply $v_j=v_{j_{ur}}$.

Alternatively, the mapping could be refined to account for the full set of grid cells $\{j_{ul}, j_{ur}, j_{ll}, j_{lr}\}$. In this case, the mapping $(i, j)\in M_{\tilde{x}_a,\tilde{x}_b}$ becomes one-to-many with $j=\{j_{ul}, j_{ur}, j_{ll}, j_{lr}\}$. With a one-to-many mapping, given grid cell i in the first image 104A with vector $v_i$, a corresponding vector $v_j$ could be determined for the corresponding region 800 of the second image 104B via an appropriately weighted bilinear interpolation of the vectors $\{j_{ul}, j_{ur}, j_{ll}, j_{lr}\}$. Equation (2) is unchanged under this definition of $v_j$, with the only difference that $v_j$ is now an interpolated vector derived from the set of grid cells j.

Whilst the above examples consider rotation, self-supervised regression-based pretext training approach can be applied much more generally with any form of transformation that can be numerically quantified (and which may or may not be geometric, or which may have a combination of geometric and non-geometric components). Other examples of geometric transformation include rescaling, translation, cropping and "tearing". Rescaling is a useful transformation for CNN feature learning, as it can help the CNN learn to recognize object patterns in a manner that is sensitive to changes in scale. Once learned on the pretext task, such features may be useful in similar desired tasks such as object size/extent detection. Translation is generally expected to be less useful in the context of CNNs, as the architecture of CNNs makes them invariant to translation. However, translation may nevertheless be useful with other ML architectures. As another example, the transformation could involve cropping the first image 104A. The pretext regression task then becomes one of predicting the numerical parameter(s) quantifying the extent of cropping (note this is not the same as simply identifying cropped/non-cropped image pairs; it is about quantifying the extent of cropping from the extracted features). For example, a useful real-world task might be quantifying the extent of object occlusion or truncation (i.e., predicting the extent to which an object is occluded by some other object or truncated from a sensor field of view). A pretext task that quantifies the extent of cropping in the pair generation may provide useful feature representations for the similar task of quantifying object occlusion in the real world. As a further example, it might be desirable to train a CNN to quantify weather or lighting conditions (e.g., to quantify rain, fog or lighting levels that might impact sensor performance). To construct a similar pretext task, the transformation may introduce some level of noise into the image during pair generation, e.g., by randomly adding and/or removing pixels with some probability; the regression pretext task is constructed as one of quantifying the level of noise that has been introduced from the features (again, this regression task over the noise level is quite different from simply identifying paired images in the presence of noise). Feature representations learned on the noise level regression task may be useful in comparable real-world regression tasks such as detecting rain level, fog level or lighting level (the latter would generally be more relevant to RGBD point clouds). Another example is a tear function that separates (tears) objects in a quantifiable way. The definition of the loss function in Equation (1) still holds, but with $\theta_{i,j}$ and $\tilde{\theta}$ being predicted and actual transformation parameter(s) more generally. The relationship between the predicted transformation $\theta_{i,j}$ and the projection vectors $v_i$, $v_j$ is defined by the pretext loss 114—the vectors themselves are simply number arrays of any desired dimensionality (including one). In the above example, the definition Equation (2) means these are interpreted as vectors lying in the BEV plane when the pretext loss 114 is applied. However, to predict other values (for example scale factor, noise level, cropping level), one-dimensional scalars $v_i$, $v_j$ could be chosen and $\theta_{i,j}$ could instead be defined as some difference between those scalar values (e.g. $v_i-v_j$, or $v_i/v_j$ etc.). This definition forces an interpretation of $v_i$, $v_j$ as relative scaling factors, or relative noise/cropping amount etc. which can be matched, in training, to the corresponding actual transformation parameter (s). Alternatively, 2D vectors could be used e.g., to predict scaling in the x and y directions independently. Equation 1 represents a general framework for pretext regression training where $\theta_{i,j}$ can be any function that compares $v_i$ and $v_j$.

As will be appreciated, given feature maps from two images, the self-supervised regression loss can be defined on any parameter or parameters of any transformation. By comparing the vector or scalar projections $v_i$, $v_j$ for each mapping (i, j), a local numerical output value is obtained, and the pretext regression loss function $\mathcal{L}_{pre}$ penalizes deviation between that local numerical output value and the global transformation parameter $\tilde{\theta}$ or the local transformation parameter $\tilde{\theta}_{i,j}$ as applicable.

Useful feature representations may be learned for any transformation 110 that preserves sufficient structure of the original image 104 to be detectable to the encoder 102 (which is dependent on the architecture of the encoder 102) and is generally related to some real-world property or properties.

Whatever the desired tasks (or tasks), training can be implemented via a suitable task-specific loss as described in further detail below, e.g., in a conventional supervised manner.

The projection layer(s) 113 and local transformation prediction component 115 constitute a dummy regression head 116. The dummy regression head 116 receives the extracted features and is trained to try to predict the relative rotation angle $\tilde{\theta}$ between the two images 104A, 104B. Although the transformation is global in this example (global rotation of the whole image), the transformation prediction component 115 is local in that it is trying to predict the global rotation angle $\tilde{\theta}$ for each pair of grid cells based on local features in the feature map 405. The dummy head 116 and encoder 102 constitute an ML system that is trained on the pretext task as described in further detail below.

Whilst in the above examples, the transformation is global and the prediction is local, the described techniques are more generally applicable. A global transformation simply means that the parameter(s) $\tilde{\theta}$ (e.g., rotation angle, scaling factor, noise level etc.) happen to be invariant across the image 104A being transformed. The same techniques could be applied with a transformation that is local in the sense that $\tilde{\theta}$ can vary across the image 104A. The loss function of Equation (1) can be extended straightforwardly to accommodate variable parameter(s) $\tilde{\theta}(i, j)$ that may have different value(s) for different pairings (i, j).

2D object detection can be used as part of the pair generation process. For example, with an RGBD point cloud, 2D object detector could be used to detect object(s) in the image plane. A BEV representation can be determined by projecting pixels of the RGBD image into the BEV plane using the values of the depth channel (D). The points belonging to the object(s) in the BEV plane are known from the 2D object detector output. This could, for example, allow a local rotation, scaling, cropping etc. to be applied to each object in the BEV plane. In other words, 2D object detection can be used to apply object-focused local transformations as part of the pair generation.

This requires a 2D object detector, which may need to be trained on large volumes of data. However, such object detectors are readily available, and it is generally more straightforward to the required volume of annotated images than it is to annotate point clouds etc.

Figure 9:
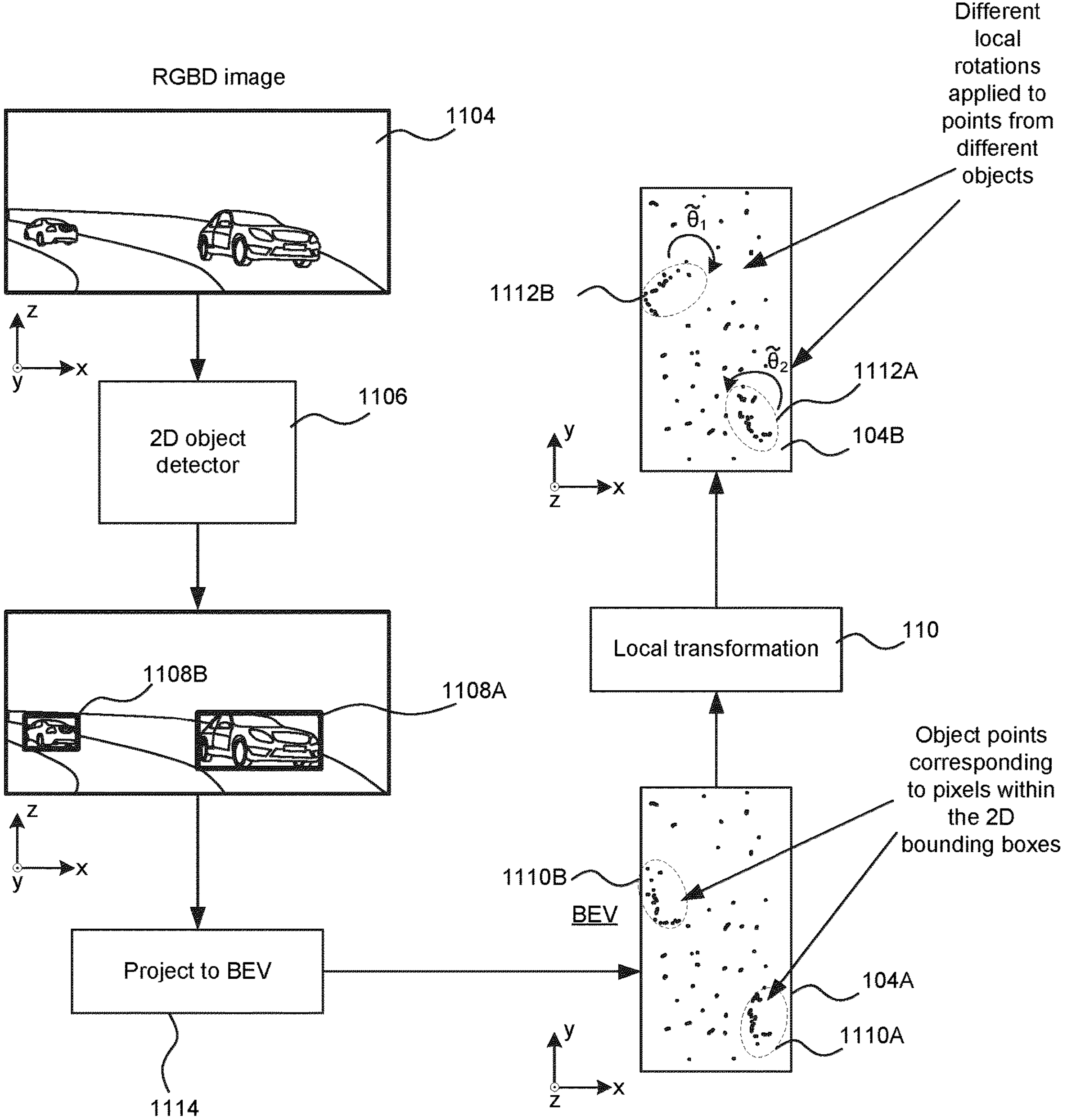
FIG. 9 shows how a 2D object detector may be used to generate paired images via the application of object-specific local transformations.

FIG. 9 shows a schematic block diagram of a system for generating paired BEV images based on local (rather than global) rotation in a way that leverages 2D image detection.

An RGBD (Red Green Blue Depth) image is denoted by reference numeral 1102. An RGBD image is a two-dimensional (2D) image representation, in the sense of a 2D array of pixels, but one that explicitly encodes 3D spatial information via a depth channel (D). The depth channel assigns a depth or disparity value to each pixel (or at least some of the pixels) indicating the depth (distance from the image plane) of a corresponding point in 3D space, in addition to the colour values of the RGB channels.

The RGBD image 102 is converted to a BEV image 1104 of the kind described above (by an image projection component 114) using its depth (D) channel. For example, in a stereo imaging context, the depth channel of the RGBD image 103 may contain pixel disparities, which can be transformed to units of distance based on a known stereo camera geometry. Alternatively, the depth channel may encode pixel depth values in units of distance, thus representing each point of the point cloud 103A directly in 3D space. The BEV is defined as the xy-plane, and the image plane of the original image is shown to lie substantially parallel to the xz-plane.

The original RGBD image 102 is passed to a 2D object detector 1106. The 2D object detector 1106 operates on one or more channels of the RGBD image 102, such as the depth channel (D), the colour (RGB) channels or both. For the avoidance of doubt, the “2D” terminology refers to the architecture of the 2D object detector, which is designed to operate on dense, 2D image representations, and does not exclude the application of the 2D object detector to the depth channel (D).

In this example, the 2D object detector 106 takes the form of a 2D bounding box detector that outputs a set of 2D bounding boxes 1108A, 1108B for a set of objects detected in the RGBD image 102. This, in turn, allows a set of object points 1110A, 1110B in the BEV image 104 to be determined for each detected object (as points corresponding to pixels within that object's 2D bounding box 1108A, 1108B).

Having determined each set of BEV object points 1108A, 1108B, different local transformations can be applied to each set of object points in the BEV image. In this example, different local rotations—by angles $\tilde{\theta}_1$ and $\tilde{\theta}_2$ respectively—are applied to each set of object points 1110A, 1110B in order to generate the paired image 104B (the rotated object points in the second image 104B are labelled 1112A and 1112B respectively). Background points (not belonging to any detected object) are left unchanged in this example.

In pretext training, the task is now to predict the applicable local rotation angle. In this example, there are two detected objects, so the task is to correctly predict the first local rotation angle $\tilde{\theta}_1$ in the vicinity of the first object and the second local rotation angle $\tilde{\theta}_2$ in the vicinity of the second object.

Unless otherwise indicated, the term “3D image” refers to a 2D image representation that explicitly encodes 3D spatial information. Examples of such 3D images include depth images (with or without colour channel(s)), RGBD images and the like.

For point clouds of other modalities, such as lidar or radar, if an image is captured substantially simultaneously with the point cloud, 2D object detection applied to the image can be used in the same way by projecting the 2D bounding boxes into the 2D or 3D space of the point cloud in order to determine the corresponding object points in the point cloud. This means 2D object detection can be applied with any modality of point cloud as a way to provide object-focused local transformation.

Alternatively, with a global transformation, the transformation prediction may also be global. For example, instead of determining a map 406 of projection vectors $v_i$, a fully connected projection layer could be used to project the feature map 405 to a single vector in the projection space. In this case, single vectors $v_a$, $v_b$ are obtained for the first and second images 104A, 104B respectively, and the summation of Equation (1) reduces to a single term.

One example of a local transformation is a set local rotations within the BEV image 104. Each local rotation would be applied to some subset of points within the image. Another example is scaling or cropping of different parts of the image 104 (with different scaling/cropping factors), introducing different levels of noise in different parts of the image 104, and attempting to quantify the local noise level based on the local features etc.

Whilst example of FIG. 9 considers RGBD point clouds (or, more generally, point clouds encoded in a depth or disparity image), the techniques are not limited in this respect. For point clouds of non-image modalities, such as lidar or radar, 2D object detection can still be leveraged when an image is captured simultaneously with the point cloud (at least approximately).

Figure 12:
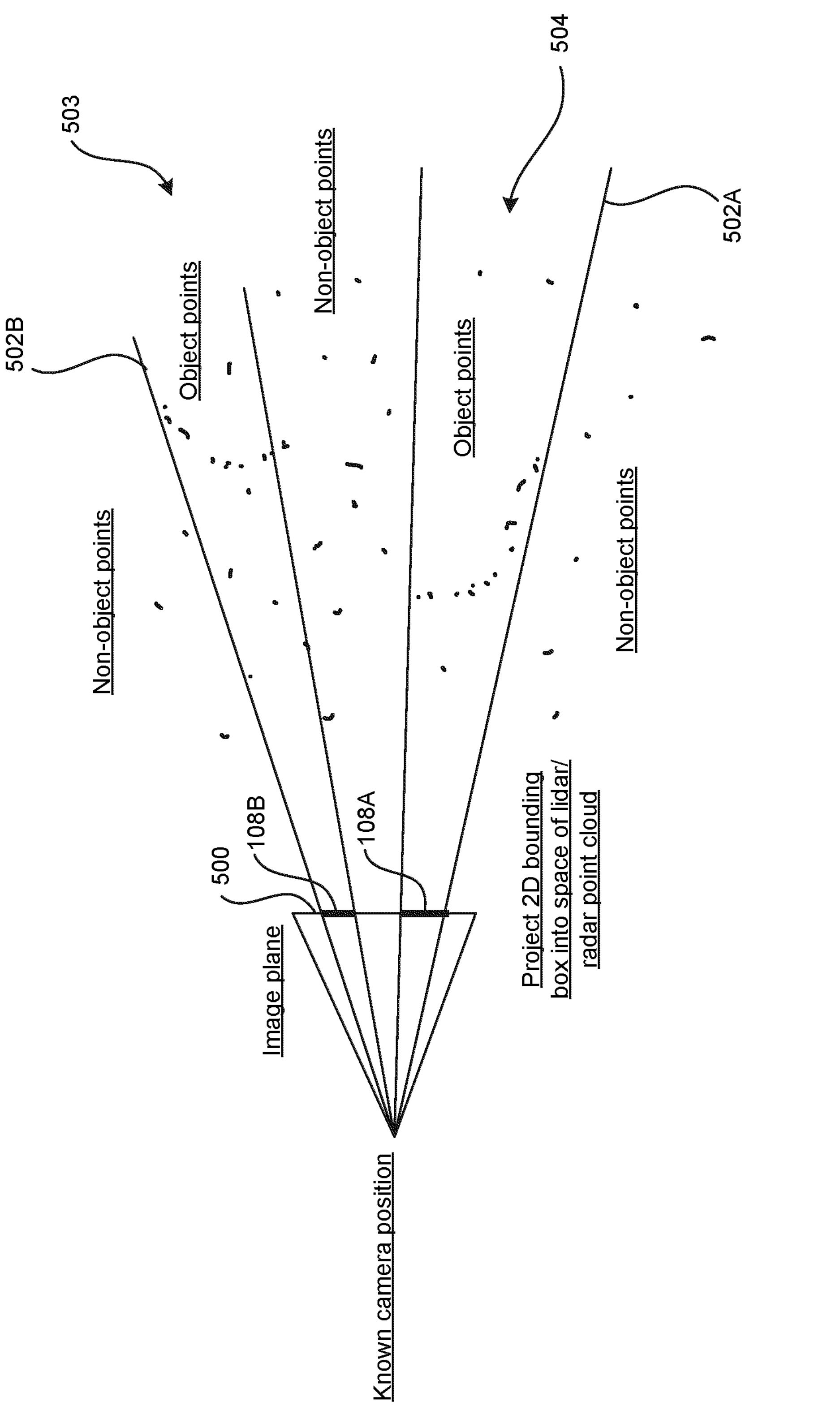
FIG. 12 shows how 2D bounding boxes detected an image can be projected into a 2D or 3D space of a lidar or radar point cloud.

FIG. 12 shows how 2D bounding boxes 108A, 108B, detected in the image plane 500 of an image, may be projected into the 2D or 3D space of an associated point cloud 503 of some other modality. The point cloud 503 has been captured approximately simultaneously with the image. Lidar point clouds are typically captured in 3D space. Radar point clouds are generally 2D and, in an autonomous vehicle context, a radar system would normally be arranged to capture spatial coordinates substantially parallel to the BEV plane based on range and azimuth measurement (although 3D radar systems are now available).

A vehicle may be equipped with at least one image sensor (camera) and at least one other sensor of a different modality, such as lidar or radar. The image sensor is registered with the other sensor. Therefore, a camera position and image plane 500 can be located in the space of the point cloud 503. Based on the known camera position, the 2D boxes 108A, 108B are projected into the space of the point cloud. The projected boxes, labelled 502A, 502B in FIG. 12, are 2D or 3D frustra in the space of the point. This, in turn, allows object points to be identified in the point cloud 503 as point lying within the relevant frustrum 502A, 502B. Background points are points lying outside of any frustra 502A, 502B.

Once object/background points have been identified in this manner, local transformations can be applied as described with reference to FIG. 9. For example, local rotation transformations may be applied to each set of object points, leaving the background points unchanged (effectively rotating each object in the scene).

To predict the 2D boxes 108A, 108B, the 2D object detector 106 is applied to the image as above. The image itself could be an RGBD image, but could also be a conventional colour (e.g. RGB) image in this case.

As already described, FIG. 10 shows an example of a possible training architecture. In this example, instead of separate pre-training/fine-tuning phases, the training on the pretext task and the training on a desired task are interleaved. The pretext and desired tasks are trained 900 on a common training set in this example. However, only a relatively small subset 900A of the training set 900 is annotated with ground truth for the desired task (e.g., ground truth bounding boxes derived via manual annotation); the remaining subset 900B is unannotated and is only used for the self-supervised pretext training. The encoder 102 is shown connected to the dummy head 116 as in FIG. 1. Additionally, the encoder 102 is also connected to one or more task-specific layer(s) 902 of a desired head, having learnable task-specific weights $w_3$. A conventional supervised loss 904 may be defined on the desired task(s), with the aim of minimizing the task-specific loss 904 with respect to the annotated subset 900A of the training data 900. A training component 906 is shown, which implements the training method as follows.

Training is performed in a sequence of training steps, each having two phases. In the first phase of each training step, one or more updates are applied the encoder weights $w_1$ and projection weights $w_2$ with the aim of optimizing the self-supervised loss 114 over the full training set 900; then, in the second phase, one or more updates update are applied to the task-specific weights $w_3$ with the aim of optimizing the task-specific loss 904 over the annotated subset 900A of the training set 900. In the second phase, the encoder weights $w_1$ may be frozen, or the encoder weights $w_1$ may be updated for a second time based on the task-specific loss 904, simultaneously with the task-specific weights $w_3$. In this manner, the task-specific training is "interleaved" with the pretext training.

Gradient descent (or ascent) is one example of a suitable training method that may be used.

Self-Supervised Training: Real Vs. Synthetic Inputs

A second approach considers a contrastive learning pretext task of associating real inputs with their synthetic counterparts.

Figure 13:
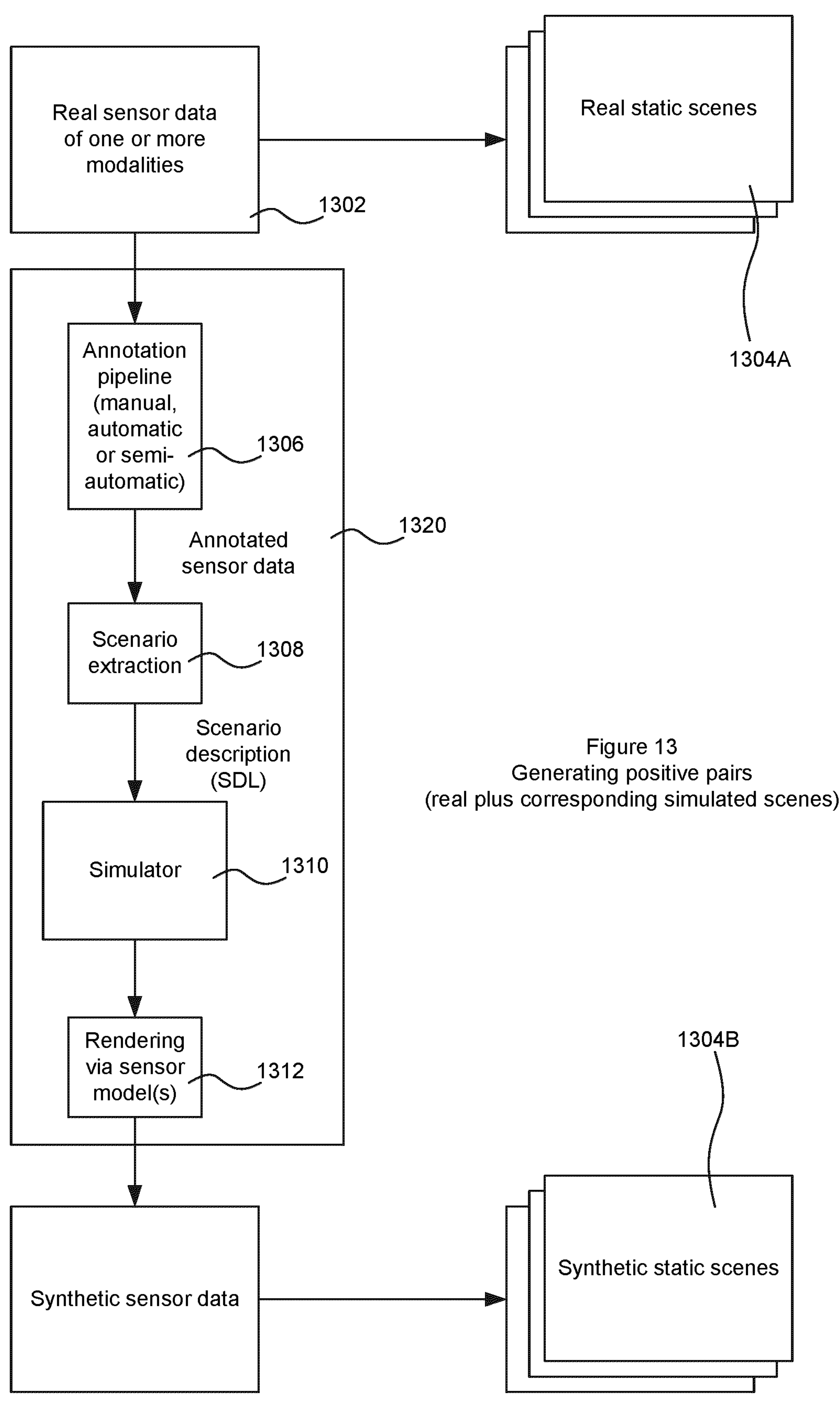
FIG. 13 shows a schematic block diagram of a system for generating paired training inputs in a second approach to self-supervised training.

FIG. 13 shows a schematic block diagram of a system for generating training inputs for a contrastive learning pretext task.

Reference numeral 1302 denotes a set of real sensor data captured using one or more physical sensors. The following examples consider sensor data captured from a sensor equipped vehicle such as image, lidar or radar data, or any combination of those modalities. The sensor data 1302 can be encoded in any suitable way, e.g., using an image, voxel, point cloud or surface mesh representation etc. or any combination thereof.

The sensor data 1302 could for example take the form of a video sequence or some other sequence of sensor data captured over some time interval. The sensor data 1302 thus captures a dynamic scene that might change over the duration of that time interval as the sensor-equipped vehicle moves or objects within the dynamic scene change or move.

A static scene is a snapshot of the dynamic scene at some time instant. The following examples consider a contrastive learning task of identifying real and simulated representations of the same static scene. For the purpose of this contrastive learning task, the real and simulated representations of that scene are associated in the above sense and constitute a positive pair of pretext training inputs. The following examples consider complex multi-object scenes of the kind that might be encountered in a driving context.

Reference numeral 1304A denotes a representation of a real static scene within the sensor data 1302, referred to as a real scene 1304A for conciseness. Reference number 1304B denotes a representation of a simulated (synthetic) version of the same scene, referred to as a simulated scene 104B for conciseness.

FIG. 13 shows multiple real static scenes of the sensor data 1302. A corresponding synthetic scene is generated for each of those real static scenes.

The static scenes 1304A, 1304B may or may not be represented in the same way as the sensor data 102. For example, the real sensor data 1302 could comprise a 3D point cloud, and the static scene could be a discretised 2D image representation of the 3D point cloud. A 2D image representation does not necessarily exclude the presence of explicitly encoded 3D spatial information. For example, a PIXOR representation of a 3D point cloud is a bird's-eye-view (BEV) image representation of that uses occupancy values to indicate the presence or absence of a corresponding point in the point cloud and, in some case, height values to fully represent the points of the point cloud (similar to the depth channel of an RGBD image). For further details, see Yang et al, "PIXOR: Real-time 3D Object Detection from Point Clouds", arXiv:1902.06326, which is incorporated herein by reference in its entirety.

The following examples consider image representations of static scenes. However, it will be appreciated that the description applies equally to other sensor data representations such as point clouds, voxel representation, surface meshes etc.

In order to generate the corresponding synthetic scene 1304B, the sensor data 1302 is processed in a processing pipeline 1320. In the following examples, it is assumed that the sensor data 1302 captures 3D spatial information (in whatever form). Within an annotation pipeline 1306, objects captured within the images are annotated and identified, via 3D annotation or a combination of both. This can be a manual, semi-automatic or fully automatic annotation process. From the annotations, a scenario description can be extracted by a scenario extraction component 1308. For example, the scenario description may be formulated in a scenario description language (SDL). The scenario description is, in turn, passed to a 3D multibody simulator 1310. This allows the dynamic scene captured in the sensor data 1302 to be recreated in the simulator 1310. Finally, for each real scene 1304A, the corresponding synthetic scene 1304B is rendered by a rendering component 1312 at the corresponding time instant in the 3D multibody simulation. For images, a rendering technique such as raycasting or raytracing can be used to render an image of the simulated scene at that time instant.

Scene extraction for the purpose of simulation and testing is known in the field of autonomous driving and advanced driver assist systems. A processing pipeline 1320 of the kind depicted in FIG. 13 would typically be used to extract scenes from sensor data in a form conducive to simulation for the purpose of testing or training. Further details of the processing pipeline 1320 are therefore omitted. A benefit of the present techniques is that they can leverage existing scene extraction architecture for the purpose of representation learning. Moreover, features learned using the described techniques can potentially address practical issues that arise in the context of simulation testing, as described below in further detail.

Whilst the above examples consider "full" 3D scene reconstruction, synthetic scenes can be generated using simpler techniques. What is germane is that the real and simulated scenes 1304A, 1304B sufficiently correspond to the same scene to allow them to be identified as a positive pair in pre-training. That is to say, what matters is that the synthetic inputs are semantically coherent with their real counterparts.

Figure 14:
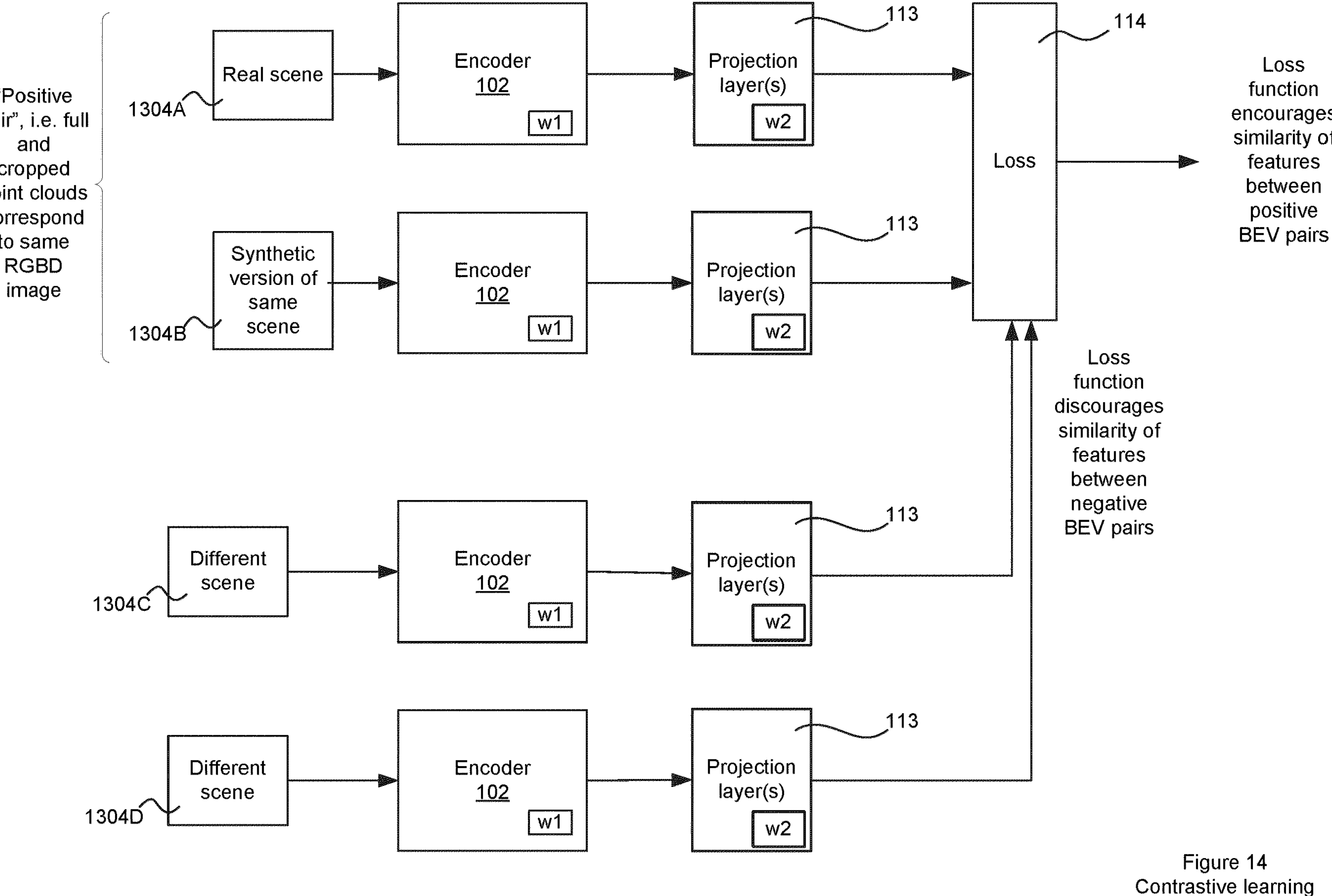
FIG. 14 shows a schematic block diagram of a contrastive learning pretext training architecture in the second approach.

FIG. 14 shows a schematic block diagram of a contrastive learning architecture applied to real and synthetic images generated according to the principles of FIG. 13. The encoder 102 receives an image (real or synthetic) as input and processes the input image based on a set of encoder weights $w_1$. In a pre-training phase, the encoder weights $w_1$ are learned via pre-training on a pretext contrastive learning task.

For the contrastive learning task, FIG. 13 depicts first and second images 1304A, 1304B that are real and simulated versions of the same scene respectively. The first and second images 1304A, 1304B therefore constitute a positive pair, as depicted in the top part of FIG. 14. Images that do not correspond to the same scene constitute negative pairs. The bottom part of FIG. 2 depicts third and fourth images 1304C, 1304D, which are not associated with each other or with the first and second images 1304A, 1304B. For the four images 1304A,1304B, 1304C,1304D depicted in FIG. 14, there are five negative pairs: the first image 1304A paired with either one of the third and fourth images 1304C, 1304D, the second image 1304B paired with either one of those images 1304C, 1304D and the third and fourth images 1304C, 1304D paired with each other. The aim of the contrastive learning task is to identify positive pairs whilst distinguishing negative pairs. Each image 1304A, 1304B, 1304C, 1304D is processed by the encoder 102 based on the encoder weights $w_1$ in order to extract a set of features therefrom. In this case, the contrastive learning loss 114 is defined so as to encourage similarity of features between positively paired images whilst discouraging similarity of features between negatively paired images.

Similar to above, the projection component 113 projects features extracted by the encoder 102 from a feature space into a projection space to obtain first and second feature projections for the first and second images 1304A, 1304B respectively. The projection component 113 is implemented as one or more layers with projection weights $w_2$. The encoder weights $w_1$ and projection weights $w_2$ are learned simultaneously with each other in training on the pretext task.

When positive image pairs are generated according to FIG. 13, the encoder 102 is encouraged to extract similar features for real and simulated representations of the same scene 1304A, 1304B. This exploits the fact that the rendering process used to generate the synthetic scene 1304B is imperfect. The above examples consider image rendering, but the same principles apply to other modelling techniques such as techniques for synthesizing radar or lidar data. Contrastive learning encourages the encoder to extract similar features for the paired real and synthetic images 1304A, 1304B. Therefore, the pretext task encourages the encoder to "look beyond" the differences between real and synthetic sensor data, and assign features based on the higher-level aspects of the static scene that are common to both. In a sense, the encoder 102 is encouraged to interpret the real and simulated scene 1304A, 1304B at a similar level to the scenario description language used to describe the scene for the purpose of simulation.

The SimCLR approach of Chen et al. can be applied with positive/negative image pairs generated in accordance with FIG. 3. Following the notation of Chen et al., a pretext training set is denoted $\{\tilde{x}_k\}$ and a positive pair of images is denoted $\tilde{x}_i, \tilde{x}_j$. The encoder 102 is represented mathematically as a function $f(\cdot)$. For a CNN encoder architecture, $f$ typically involves a series of convolutions and non-linear transformations applied in accordance with the encoder weights $w_1$. The output representation of the encoder 102 is denoted $h_i = f(\tilde{x}_i)$ for a given input $\tilde{x}_i$. The projection component 113 is implemented as small neural network projection head $g(\cdot)$ that transforms the representation into a space in which the contrastive loss 114 is applied (the projection space). The contrastive loss is defined between a given positive pair $\tilde{x}_i, \tilde{x}_j$ in minibatch of 2N images as:

$$\ell_{i,j} = -\log \frac{\exp(sim(z_i, z_j)/\tau)}{\sum_{k=1}^{2N} 1\!\!1_{[k \neq i]} \exp(sim(z_i, z_k)/\tau)}, \quad (1)$$

where $z_i=g(h_i)$, $\tau$ is a constant, $\text{sim}(u, v)=u^T v/\|u\|\|v\|$ denotes the dot product between $l_2$ normalized u and v and an indicator function $\mathbb{1}$ [k≠i] is 1 if k≠j and 0 otherwise. For pre-training, the loss is computed across all positive pairs in $\{\tilde{x}_k\}$, with the numerator in Equation (1) acting to encourage similarity of features between positively paired images $\tilde{x}_i$, $\tilde{x}_j$, and the denominator acting to discourage similarity of features between $\tilde{x}_i$ and all other images. The loss function of Equation 1 is a normalized temperature-scaled cross-entropy loss (NT-Xent). As will be appreciated, this is just one example of a viable contrastive loss that can be applied with paired images generated as per FIG. 13. Other contrastive learning approaches can be applied to paired images generated according to the present teaching.

Referring to FIG. 14, when $\tilde{x}_i$ is the real scene 1304A, the corresponding simulated scene 1304B would be $\tilde{x}_j$; the real image 1304A paired with the third image 104C and the real scene 1304A paired the fourth image 1304D are negative pairs that contribute to the summation over negative pairs in the denominator for $\tilde{x}_i$.

A benefit of the described approach is that it makes the encoder 102 less sensitive to discrepancies between real and synthetic data: by definition, the encoder 102 performs well when it assigns similar features to a real input and its synthetic counterpart.

This increased robustness is relevant, for example, in simulation-based testing of AV and ADAS components. Simulation is widely recognized as a vital tool for testing the performance of AV and ADAS stacks. There are various approaches to simulation testing. Full-stack testing via photorealistic/sensor realistic simulation is one approach. Synthetic sensor data generated using sensor model(s) feeds into a perception system of the stack, which processes the synthetic sensor data as it would real sensor data and provides perception outputs to higher level components of the stack (e.g., prediction, motion planning etc.). For the results to be useful, the synthetic sensor data needs to be sufficiently realistic to cause the same response in the perception system as real-world data.

One problem is that certain perception components, such as Convolutional Neural Networks (CNNs) trained using existing methods, are particularly sensitive to the quality of the simulated data. Although it is possible to generate high quality simulated image data, the CNNs in perception are extremely sensitive to even the minutest deviations from real data. Here, the issue is a high degree of sensitivity to small discrepancies.

Another problem is that certain types of sensor data are hard to model. Thus, even a perception system that is not particularly sensitive to the quality of the input data will give poor results, e.g., RADAR falls into the category of sensor data that is difficult to synthesise. This is because the physics of RADAR is inherently hard to model. Here, the issue is that the discrepancies between the real and synthetic data are large even for state-of-the-art sensor models.

The techniques here can potentially mitigate these issues because the pretext training makes the encoder 102 less sensitive to the discrepancies between real and simulated data. A perception system that incorporates the encoder 102 may, therefore, perform more reliably on synthetic sensor data (i.e., more closely matching its performance on real sensor data)—particularly if the discrepancies between the real and synthetic sensor data encountered in feature learning are similar to the discrepancies in subsequent simulation-based testing (whether or not those discrepancies are small or large). This, in turn, means that the perception system may be more conducive to simulation-based testing. Using the techniques herein, an AV or other robotic perception system can thus be designed that achieves a required level of performance on real data, whilst also being more suited to simulation-based testing before it is deployed at scale in the real world.

The present techniques can be implemented using existing data sets that are already available. For example, the KITTI vision benchmark suit contains large quantities of high-resolution images captured from sensor-equipped vehicles (available at www.cvlibs.net/datasets/kitti at the time of writing). The more recent Virtual KITTI 2 Dataset provides a photo-realistic synthetic version of the KITTI dataset (see Cabon et al. "Virtual KITTI 2" (2020), arXiv:2001.10773). Real-synthetic positive pairs could be generated for contrastive learning, e.g., by pairing real images or video sequences from the KITTI dataset with their synthetic counterparts in Virtual KITTI 2.

Note that the term "synthetic" herein does not necessarily imply photorealism or sensor-realism. Synthetic sensor data that might be considered "poor quality" in other contexts can still be useful in the present context if it is semantically coherent with its real counterpart. Indeed, larger discrepancies between the real and simulated sensor data are potentially beneficial because larger discrepancies force the encoder 102 to look for "higher-level" semantic similarities between real and synthetic inputs.

The simulator 1310 is a computer program that provides a three-dimensional environmental model which reflects the physical environment that a vehicle may operate in. In a driving context, the 3D environmental model defines at least the road network on which an autonomous vehicle is intended to operate, and other actors in the environment.

The rendering component 1312 provides a sensor simulation system which models one or more types of sensor with which a vehicle may be equipped (e.g., camera, radar, lidar etc.).

Synthetic sensor data is generated using one or more sensor models, i.e., based on known physics of a sensor system(s) to be modelled. Such techniques generally involve constructing a 3D model of a scene (e.g., in the simulator 1310) and modelling the physics of relevant signals interacting with the 3D model of the scene. For a camera or camera system, this typically models rays within a spectrum detectable to the camera. For example, synthetic images can be rendered using raytracing, raycasting or other image rendering techniques. Lidar can be similarly modelled via tracing of a laser beam(s) emitted by a lidar system and propagated through the 3D-model of the scene. Radar can be similarly modelled based on the known physical properties of radio waves transmitted and detected by a radar system.

As noted, the described techniques can be applied to any sensor data representation, such as image or voxel representations, point clouds in 2D or 3D space etc. Training input can also comprise sensor data of multiple modalities, e.g., point clouds and images, or fused point clouds of different modalities. Unless otherwise indicated, the term "3D image" refers to a 2D image representation that explicitly encodes 3D spatial information. Examples of such 3D images include depth images (with or without colour channel(s)), RGBD images and the like.

Self-Supervised Training Based on 2D Detections

A third approach to self-supervised learning on 3D inputs leverages information from a 2D object detector or other 2D perception component.

Figure 15:
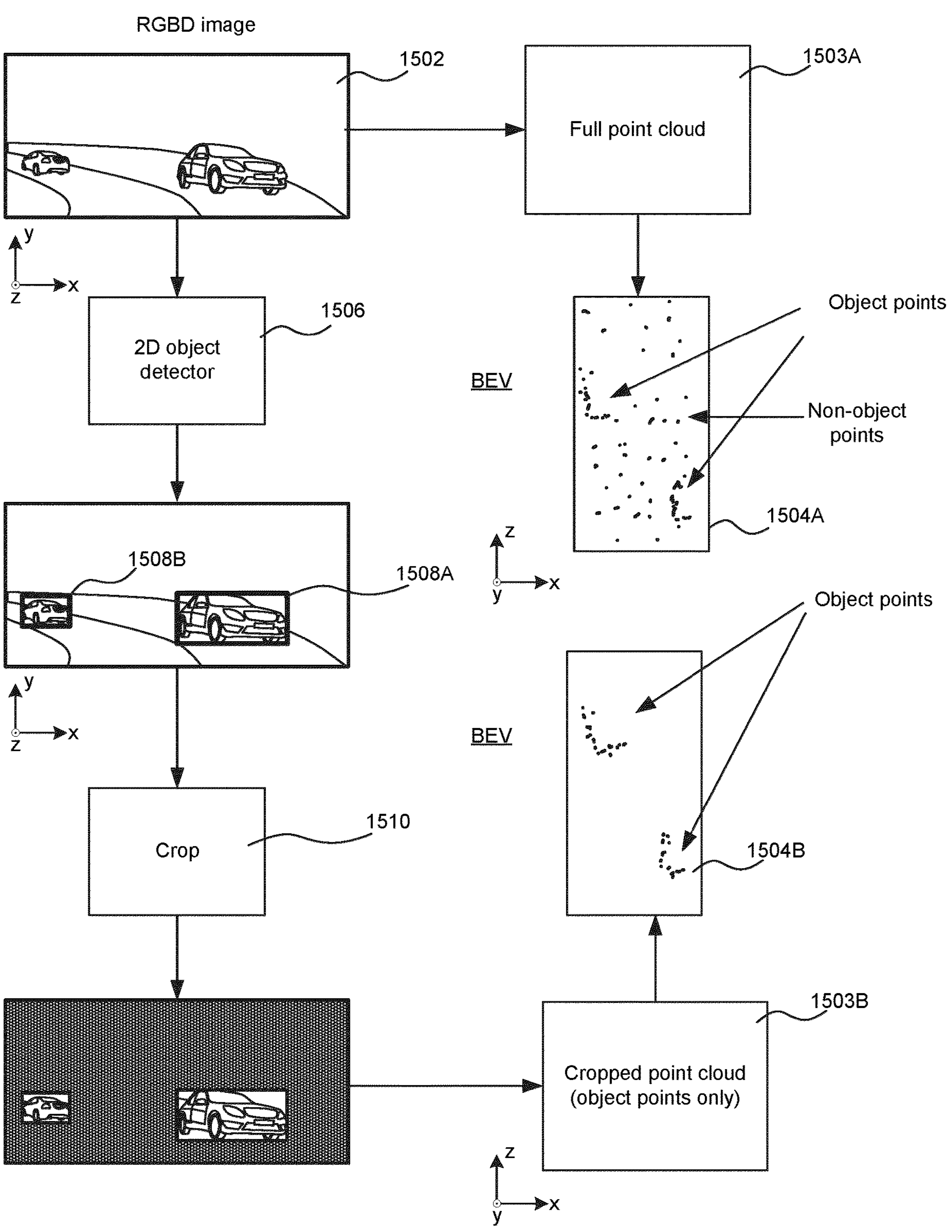
FIG. 15 shows a schematic block diagram of a system for generating paired training inputs in a third approach to self-supervised training.

FIG. 15 shows a schematic block diagram of a system for generating training inputs for a contrastive learning pretext task.

An RGBD (Red Green Blue Depth) image is denoted by reference numeral 1502. An RGBD image is a two-dimensional (2D) image representation, in the sense of a 2D array of pixels, but one that explicitly encodes 3D spatial information via a depth channel (D). The depth channel assigns a depth or disparity value to each pixel (or at least some of the pixels) indicating the depth (distance from the image plane) of a corresponding point in 3D space, in addition to the colour values of the RGB channels.

In relation to the third approach, unless otherwise indicated, the term "3D image" refers to a 2D image representation that explicitly encodes 3D spatial information. Examples of such 3D images include depth images (with or without colour channel(s)), RGBD images and the like.

The depth channel of the RGBD image 1502 encodes a 3D point cloud 1503A, i.e., a set of points in 3D space. For example, in a stereo imaging context, the depth channel of the RGBD image 1502 may contain pixel disparities, which can be transformed to units of distance based on a known stereo camera geometry. Alternatively, the depth channel may encode pixel depth values in units of distance, thus representing each point of the point cloud 1503A directly in 3D space.

In order to provide a paired training input, the original RGBD image 1502 is passed to a 2D object detector 1506. The 2D object detector 1506 operates on one or more channels of the RGBD image 1502, such as the depth channel (D), the colour (RGB) channels or both. For the avoidance of doubt, the "2D" terminology refers to the architecture of the 2D object detector, which is designed to operate on dense, 2D image representations, and does not exclude the application of the 2D object detector to the depth channel or to a 3D image (in the above sense) more generally.

In this example, the 2D object detector 1506 takes the form of a 2D bounding box detector that outputs a set of 2D bounding boxes 1508A, 1508B for a set of objects detected in the RGBD image 1502. This, in turn, allows object points, corresponding to pixels that are contained within one of the 2D bounding boxes 1508A, 1508B, to be distinguished from non-object point that correspond to pixels not contained within any 2D bounding box 1508A, 108B.

A cropping component 1510 uses the 2D bounding boxes 1508A, 1508B to generate a "cropped" point cloud 1503B containing only object points.

The cropped point cloud 1503B and the full point cloud 1503A of the same RGBD image 1502 constitute a positive pair for the purpose of contrastive learning.

FIG. 1 depicts first and second birds-eye-view (BEV) images 1504A, 1504B of the full and cropped point clouds 1503A, 1503B respectively. The BEV images 1504A, 1504B are transformed versions of the original RGBD image 1502, projected into a different image plane.

In the example depicted, the original RGBD image 1502 is shown to capture a relatively complex multi-object scene of the kind that that might be encountered by a sensor-equipped vehicle. The RGBD image 1502 captures a view of the scene in a generally vertical image plane. For convenience, a cartesian coordinate system is defined with the image plane of the original RGBD image 1502 lying parallel to the x-y plane, and the z-direction perpendicular to it. The BEV plane of the transformed images 1504A, 1504B lies substantially parallel to the x-z plane, and each of those images represents a version of the scene in the BEV plane.

The BEV images 1504A, 1504B are discretised BEV representations of the paired point clouds 1504A, 1504B. For the purposes of illustration, the following examples consider training inputs in the form of image representations of point clouds, i.e., sensor data represented in a structured two-dimensional (2D) pixel array. As noted above, a 2D image representation does not necessarily exclude the presence of explicitly encoded 3D spatial information. For example, a PIXOR representation of a 3D point cloud is a BEV image representation of that uses occupancy values to indicate the presence or absence of a corresponding point in the point cloud and, in some case, height values to fully represent the points of the point cloud (similar to the depth channel of an RGBD image). For further details, see Yang et al, "PIXOR: Real-time 3D Object Detection from Point Clouds", arXiv:1902.06326, which is incorporated herein by reference in its entirety.

FIG. 15 shows the paired image 1504B without any background points.

Figure 15A:
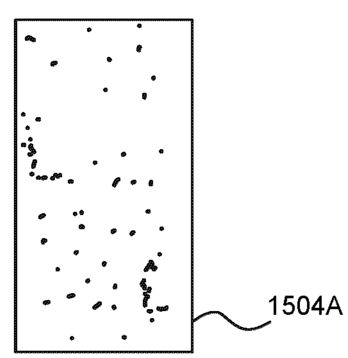
FIG. 15A shows a block schematic block diagram of a pair generation function implemented via cropping of background point and injection of random background noise.
Figure 15A:
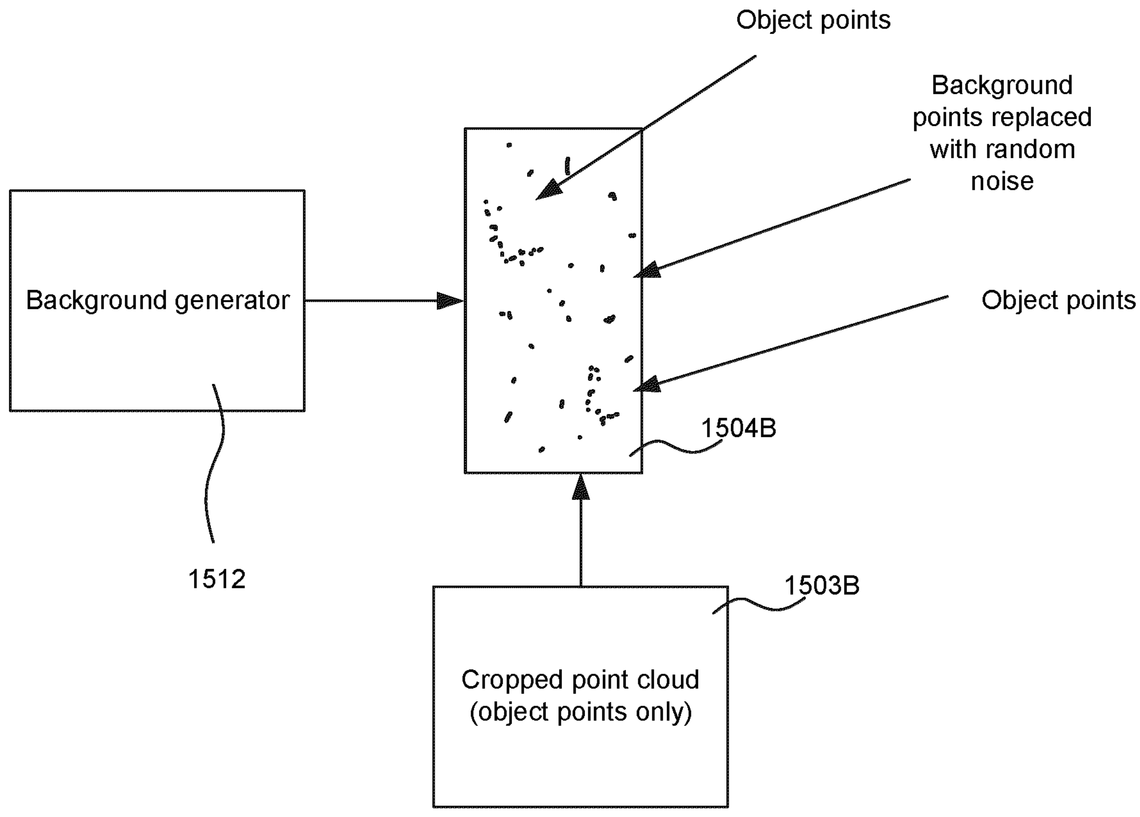

FIG. 15A shows an extension of the system, in which a background generator 1512 inserts randomly generated noise into the second image 1504A in place of the removed object points. The random noise has a similar density to the original background points in the first image 1504A. The addition of random background noise makes the two images 1504A. 1504B appear more similar, and may be able to improve performance of the encoder 102 on the contrastive learning task.

Figure 16:
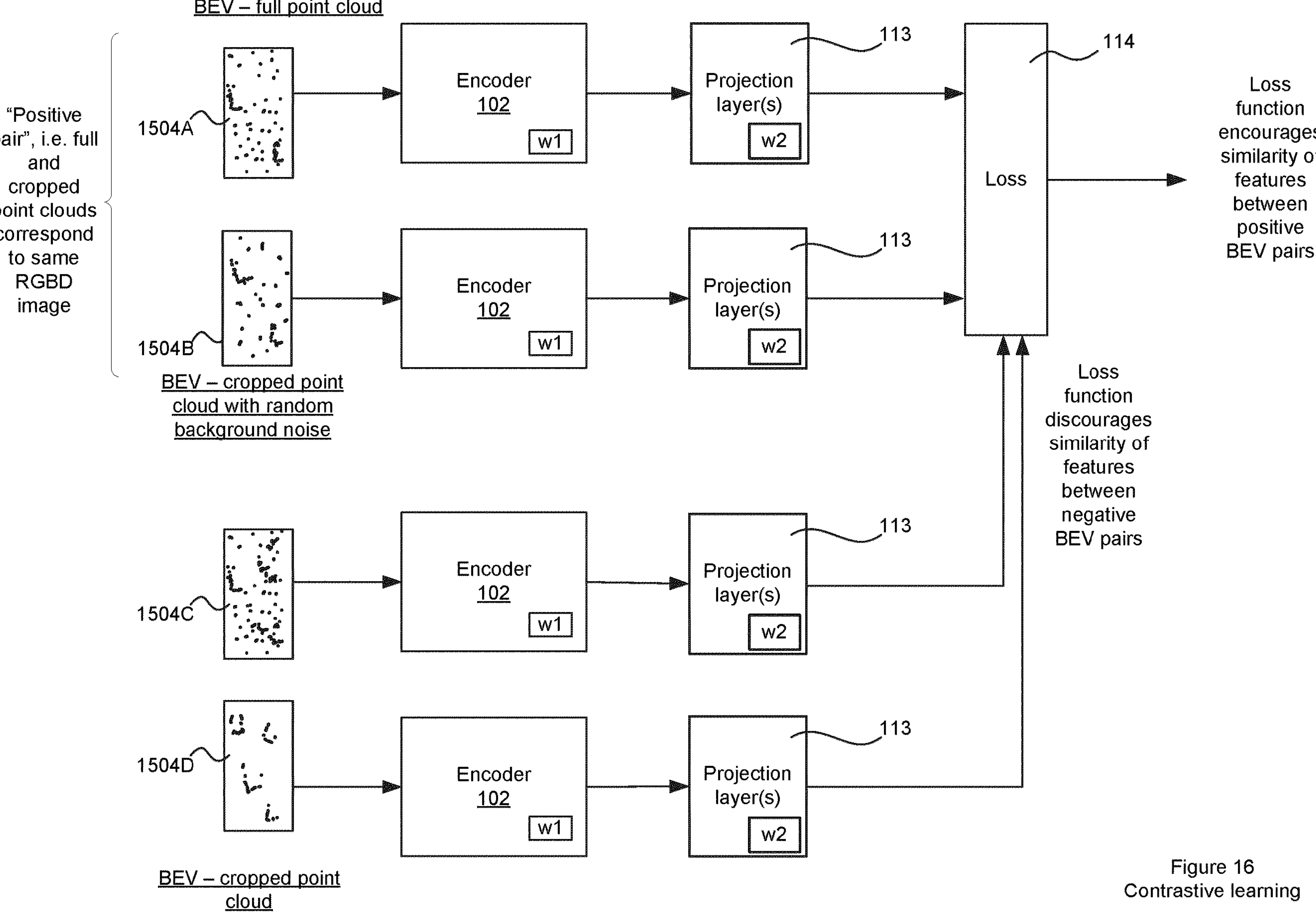
FIG. 16 shows a schematic block diagram of a contrastive learning pretext training architecture in the third approach.

FIG. 16 shows a schematic block diagram of a contrastive learning architecture applied to BEV images generated according to the principles of FIG. 15. The encoder 102 receives a BEV image as input and processes the input image based on a set of encoder weights $w_1$. In a pre-training phase, the encoder weights $w_1$ are learned via pre-training on a pretext contrastive learning task.

For the contrastive learning task, the first and second BEV images 1504A, 1504B of FIG. 15 are associated images corresponding to the same RGBD image 1502. The first and second images 1504A, 1504B therefore constitute a positive pair, as depicted in the top part of FIG. 15. BEV images that do not correspond to the same RGBD image constitute negative pairs. The bottom part of FIG. 16 depicts third and fourth BEV images 1504C, 1504D, which are not associated with each other or with the first and second images 1504A, 1504B. For the four BEV images 1504A,1504B, 1504C, 1504D depicted in FIG. 16, there are five negative pairs: the first image 1504A paired with either one of the third and fourth images 1504C, 1504D, the second image 1504B paired with either one of those images 1504C, 1504D and the third and fourth images 1504C, 1504D paired with each other. The aim of the contrastive learning task is to identify positive pairs whilst distinguishing negative pairs. Each BEV image 1504A, 1504B, 1504C, 1504D is processed by the encoder 102 based on the encoder weights $w_1$ in order to extract a set of features therefrom. In the third approach, the contrastive learning loss 114 is defined so as to encourage similarity of features between positively paired images whilst discouraging similarity of features between negatively paired images.

When positive image pairs are generated according to FIG. 15, this means that the encoder 102 is encouraged to extract similar features for corresponding object points in cropped and non-cropped BEV images. In other words, once trained, the presence or absence of non-object points in a BEV image should have minimal effect on the features that are assigned to object points; in assigning features to object points, the encoder is 102 is encouraged to consider only object points and disregard any non-object points that might be present.

As in the second approach, the SimCLR approach of Chen et al. can be applied with positive/negative image pairs generated in accordance with FIG. 15. Referring to Equation 1 above, when $\tilde{x}_i$ is the first image 1504A, the second image 1504B would be $\tilde{x}_j$; the first image 1504A paired with the third image 1504C and the first image 1504A paired the fourth image 1504D are negative pairs that contribute to the summation over negative pairs in the denominator for $\tilde{x}_i$.

Whilst the above considers RGBD point clouds (or, more generally, point clouds encoded in a depth or disparity image), the third approach is not limited in this respect. For point clouds of non-image modalities, such as lidar or radar, 2D object detection can still be leveraged when an image is captured simultaneously with the point cloud (at least approximately).

The techniques of FIG. 12 may be used in this context. In the first approach, the processing of FIG. 12 is applied to apply different local transformations to different parts of a point cloud. In the second approach, the processing is performed to identify and remove/transform background points. Once object/background positive have been identified in this manner, positive pairs can be generated for the non-RGBD point cloud 503 as described above.

To predict the 2D boxes 108A, 108B, the 2D object detector 106 is applied to the image as above. The image itself could be an RGBD image, but could also be a conventional colour (e.g. RGB) image in this case.

As noted, the described techniques can be applied to any sensor data representation, such as image or voxel representations, point clouds in 2D or 3D space etc. Training input can also comprise sensor data of multiple modalities, e.g., point clouds and images, or fused point clouds of different modalities.

If the encoder 102 is implemented with an ML architecture that operates directly on point clouds, such as PointNet, the original/cropped point clouds 1503A, 1503B of FIG. 1 could be used as a contrastive learning pair directly, without the "intermediate" discretised BEV representations 1504A, 1504B. In this case, optionally, randomized 2D or 3D background points can be injected into the second point cloud 104B, as per FIG. 1A. This also applies to other modalities of point clouds.

As an alternative to using the original point cloud 1503A or its BEV image representation 1504A, two cropped or otherwise transformed point clouds/BEV images could be used, each with different background noise.

As an alternative to removing background points, the background points could be distorted or otherwise transformed.

Whilst the above examples use 2D object detection to crop-out or transform background points, other transformations that leverage 2D object detection can be applied. For example, object points may be transformed leaving background points unchanged, or object points may be transformed in a different way to the background points and/or for different objects.

The principles can also be applied to synthetic sensor data, and it is noted that the term sensor data herein covers not only real sensor data but also synthetic sensor data generated using appropriate sensor model(s).

In all of the above approaches, the projection layer(s) 113 is learned, in the sense of having projection weights $w_2$ that are learned simultaneously with the encoder weights $w_1$ during training on the pretext task. The projection layer(s) 113 does not form part of the encoder 102 and the projection weights $w_2$ may be discarded once pretext training is complete. This architecture is useful to prevent the encoder weights $w_1$ from becoming overly sensitive to the pretext task. In practice, a single prediction layer 113 has been found to achieve a good balance between, on the one hand, retaining useful knowledge in the encoder 102 and, on the other hand, preventing the encoder 102 from becoming too specific to the pretext task. However, this may be context dependent and, in some cases, it may be possible to achieve good encoder performance with no projection layers or with multiple projection layers. In a neural network architecture, the projection layer(s) 113 are any layer(s) that are discarded after pretext training (or, more precisely, which are not used for the purpose of the desired task(s)), and the encoder 113 means the remaining layers before the discarded/unused layer(s).

The above examples consider images, but the specific techniques can be readily extended to voxel representations. The same principles of regression-based pretext training can be readily extended to any data representation of spatial sensor data (such as unordered/non-discretised point clouds in 2D or 3D space, surface meshes etc.). The techniques are not specific to point clouds and can be applied to any sensor data (including conventional RGB/colour images). The principles can also be applied to synthetic sensor data, and it is noted that the term sensor data herein covers not only real sensor data but also synthetic sensor data generated using appropriate sensor model(s).

Figure 11:
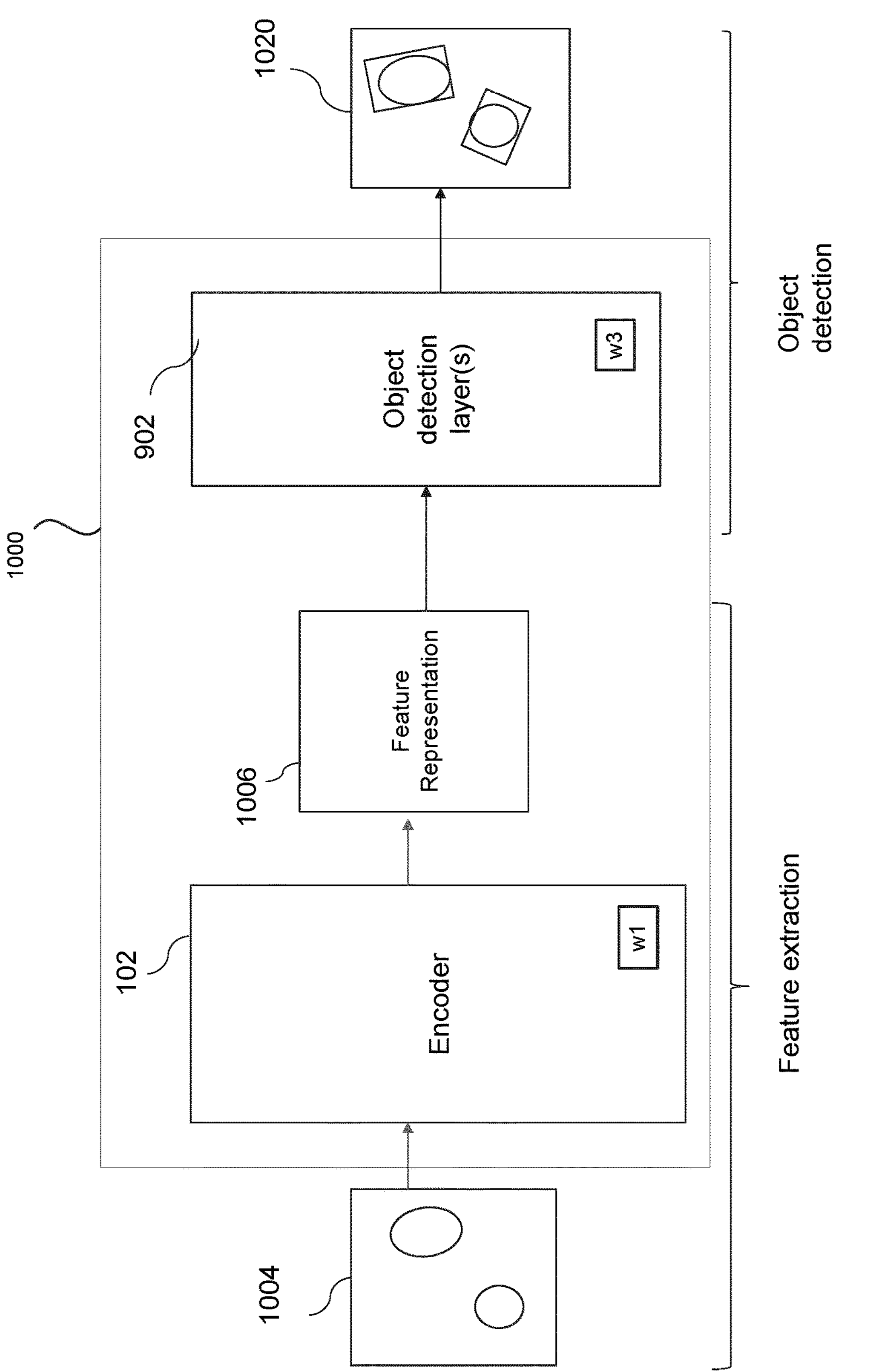
FIG. 11 shows a schematic block diagram of a computer system configured to implement a trained encoder.

FIG. 11 shows a computer system 1000 configured to implement the trained encoder 102 for a bounding box detection task. An input image or other data representation 1004 is input to the trained encoder 102. A feature representation 1006 is extracted by the trained encoder 102 and passed to the trained task-specific layer(s) 902, which have been trained as a bounding box detector in this example. The encoder 102 and task-specific layers 102, 902 operate on their inputs as described above in the context of training (the feature representation 1006 is a feature map of the same kind extracted in training). The difference is that the weights $w_1$, $w_3$ have been learned by this point such that the encoder 102 and object detector 902 are now performing useful tasks. The task-specific layer(s) 902 output a set of object predictions, in the form of predicted bounding boxes 1020. It will be appreciated this is merely one example of a practical application of the trained encoder 102. The task-specific layers 902 can be trained to use the features for any desired task.

Whilst FIG. 11 considers a bounding box detector 902, this is merely one example of a perception component that can use extracted features. Examples of perception methods include object or scene classification, orientation or position detection (with or without box detection or extent detection more generally), instance or class segmentation etc., any of which can be implemented using feature representations learned in accordance with the present teaching.

Herein, the term "perception" refers generally to methods for recognizing patterns exhibited in sensor data representations, such as images, point clouds, voxel representations, mesh representations etc. State-of-the-art perception methods are typically ML-based, and many state-of-the art perception method use deep convolutional neural networks (CNNs). Pattern recognition has a wide range of applications including object detection/localization, object/scene recognition/classification, instance segmentation etc.

Object detection and object localization are used interchangeably herein to refer to techniques for locating objects in point clouds and other data representations in a broad sense; this includes 2D or 3D bounding box detection, but also encompasses the detection of object location and/or object pose (with or without full bounding box detection), and the identification of object clusters. Object detection/localization may or may not additionally classify objects that have been located (for the avoidance of doubt, whilst, in the field of machine leaning, the term "object detection" sometimes implies that bounding boxes are detected and additionally labelled with object classes, the term is used in a broader sense herein that does not necessarily imply object classification or bounding box detection).

References herein to components, functions, modules and the like, denote functional components of a computer system which may be implemented at the hardware level in various ways. This includes the encoder 102, the projection layer(s) 113, the task-specific layer(s) 902, the training component 906 and the other components depicted in FIGS. 1 and 9 (among others). Such components may be implemented in a suitably configured computer system. A computer system comprises one or more computers that may be programmable or non-programmable. A computer comprises one or more processors which carry out the functionality of the aforementioned functional components. A processor can take the form of a general-purpose processor such as a CPU (Central Processing unit) or accelerator (e.g. GPU) etc. or more specialized form of hardware processor such as an FPGA (Field Programmable Gate Array) or ASIC (Application-Specific Integrated Circuit). That is, a processor may be programmable (e.g. an instruction-based general-purpose processor, FPGA etc.) or non-programmable (e.g. an ASIC). Such a computer system may be implemented in an onboard or offboard context in the context of fully/semi-autonomous vehicles and mobile robots. Training may be performed in the same or a different computer system to that in which the trained components are deployed. Training of modern deep networks will typically be carried out using GPUs or other accelerator processors.

References is made to ML models, such as CNNs or other neural networks. This terminology refers to a component (software, hardware, or any combination thereof) configured to implement ML techniques.

The invention claimed is:

1. A computer-implemented method of training an encoder together with a perception component based on a training set comprising unannotated sensor data sets and annotated sensor data sets, each annotated sensor data set having an associated annotation, the encoder having a set of encoder parameters, and the perception component having a set of task-specific parameters, the method comprising:

performing a sequence of multiple training steps, wherein each training step comprises:

in a first phase of the training step, updating the set of encoder parameters based on the unannotated sensor data sets, with an aim of optimizing a self-supervised loss function, without updating the set of task-specific parameters of the perception component, in a second phase of the training step, updating the set of task-specific parameters based on the annotated sensor data sets, with the aim of optimizing a task-specific loss function, wherein the encoder as updated in the first phase of that training step processes a data representation of each annotated sensor data set to extract features therefrom, wherein the perception component processes the extracted features to compute an output therefrom, and wherein the task-specific loss is defined on the output and the associated annotation for each annotated sensor data set for learning a desired perception task; and whereby, in performing the sequence of multiple training steps, the method alternates between the first phase and the second phase, thereby interleaving the training of the perception component with the training of the encoder.

2. The method of claim 1, wherein the self-supervised loss function is defined on positive training examples, each positive training example comprising at least two associated data representations of a same sensor data set.

3. The method of claim 2, wherein the self-supervised loss function is a contrastive loss function that is optimized in the first phase with the aim of identifying associated data representations.

4. The method of claim 2, wherein the at least two data associated representations are related by a transformation parameterized by at least one numerical transformation value, wherein the encoder extracts respective features from the at least two data associated representations of each positive training example, wherein at least one numerical output value is computed from the extracted features, and wherein the self-supervised loss function is a regression loss function that encourages the at least one numerical output value to match the at least one numerical transformation value parameterizing the transformation.

5. The method of claim 1, wherein a projection component projects features extracted by the encoder from a feature space into a projection space, wherein the self-supervised loss is defined in the projection space, and wherein a set of projection parameters of the projection component is updated in the first phase simultaneously with the set of encoder parameters.

6. The method of claim 1, wherein the set of encoder parameters is frozen in the second phase.

7. The method of claim 1, wherein the set of encoder parameters is further updated in the second phase based on the task-specific loss, simultaneously with the set of perception parameters.

8. The method of claim 1, wherein a single update is applied to the set of encoder parameters in the first phase of each training step, and a single update is applied to the set of perception parameters in the second phase of each training step.

9. The method of claim 1, wherein multiple updates are applied to the set of encoder parameters in the first phase of each training step, and/or multiple updates are applied to the set of perception parameters in the second phase of each training step.

10. The method of claim 9, wherein a different number of updates are applied in the second phase than the first phase.

11. The method of claim 10, wherein a greater number of updates are applied in the second phase than the first phase.

12. The method of claim 1, wherein each data representation is an image or voxel representation.

13. The method of claim 12, wherein each data representation is an image or voxel representation of a 2D or 3D point cloud.

14. The method of claim 1, wherein each sensor data set comprises 3D sensor data.

15. The method of claim 1, wherein in the first phase of each training step, the set of encoder parameters is updated based on the annotated and unannotated sensor data sets, wherein the self-supervised loss function is independent of the annotations.

16. The method of claim 1, wherein each annotated dataset comprises real sensor data.

17. The method of claim 16, wherein the associated annotation is a manual annotation.

18. A computer system comprising:

at least one memory configured to store computer-readable instructions;

at least one hardware processor coupled to the at least one memory and configured to execute the computer-readable instructions, which upon execution cause the at least one hardware processor to train an encoder and a perception component, based on a training set comprising unannotated sensor data sets and annotated sensor data sets, each annotated sensor data set having an associated annotation, the encoder having a set of encoder parameters, and the perception component having a set of task-specific parameters by:

performing a sequence of multiple training steps, wherein each training step comprises:

in a first phase of the training step, updating the set of encoder parameters based on the unannotated sensor data sets, with an aim of optimizing a self-supervised loss function, without updating the set of task-specific parameters of the perception component, in a second phase of the training step, updating the set of task-specific parameters based on the annotated sensor data sets, with the aim of optimizing a task-specific loss function, wherein the encoder as updated in the first phase of that training step is configured to process a data representation of each annotated sensor data set to extract features therefrom, wherein the perception component is configured to process the extracted features to compute an output therefrom, and wherein the task-specific loss is defined on the output and the associated annotation for each annotated sensor data set for learning a desired perception task; and whereby the sequence of multiple training steps alternates between the first phase and the second phase, thereby interleaving the training of the perception component with the training of the encoder;

wherein the encoder is configured to receive an input sensor data representation and extract features therefrom, and the perception component is configured to use the extracted features to interpret the input sensor data representation.

19. The computer system of claim 18, wherein the self-supervised loss function is defined on positive training examples, each positive training example comprising at least two associated data representations of a same sensor data set.

20. A non-transitory medium embodying computer-readable instructions configured, when executed on one or more hardware processors, to train an encoder together with a perception component based on a training set comprising unannotated sensor data sets and annotated sensor data sets, each annotated sensor data set having an associated annotation, the encoder having a set of encoder parameters, and the perception component having a set of task-specific parameters, by:

performing a sequence of multiple training steps, wherein each training step comprises:

in a first phase of the training step, updating the set of encoder parameters based on the unannotated sensor data sets, with an aim of optimizing a self-supervised loss function, without updating the set of task-specific parameters of the perception component, in a second phase of the training step, updating the set of task-specific parameters based on the annotated sensor data sets, with the aim of optimizing a task-specific loss function, wherein the encoder as updated in the first phase of that training step processes a data representation of each annotated sensor data set to extract features therefrom, wherein the perception component processes the extracted features to compute an output therefrom, and wherein the task-specific loss is defined on the output and the associated annotation for each annotated sensor data set for learning a desired perception task; and whereby the sequence of multiple training steps alternates between the first phase and the second phase, thereby interleaving the training of the perception component with the training of the encoder.

* * * * *